(12) United States Patent
Crego et al.

(10) Patent No.: US 11,648,962 B1
(45) Date of Patent: May 16, 2023

(54) SAFETY METRIC PREDICTION

(71) Applicant: Zoox, Inc., Foster City, CA (US)

(72) Inventors: Andrew Scott Crego, Foster City, CA (US); Antoine Ghislain Deux, Seattle, WA (US); Ali Ghasemzadehkhoshgroudi, Foster City, CA (US); Rodin Lyasoff, Mountain View, CA (US); Andreas Christian Reschka, Foster City, CA (US)

(73) Assignee: Zoox, Inc., Foster City, CA (US)

(*) Notice: Subject to any disclaimer, the term of this patent is extended or adjusted under 35 U.S.C. 154(b) by 166 days.

(21) Appl. No.: 17/152,645

(22) Filed: Jan. 19, 2021

(51) Int. Cl.
| | |
|---|---|
| *B60W 30/09* | (2012.01) |
| *G06N 20/00* | (2019.01) |
| *B60W 60/00* | (2020.01) |
| *G05D 1/00* | (2006.01) |
| *G05D 1/02* | (2020.01) |
| *G07C 5/02* | (2006.01) |

(52) U.S. Cl.
CPC ........ *B60W 60/0015* (2020.02); *B60W 30/09* (2013.01); *B60W 60/0027* (2020.02); *G05D 1/0061* (2013.01); *G05D 1/0214* (2013.01); *G06N 20/00* (2019.01); *B60W 2520/10* (2013.01); *B60W 2520/12* (2013.01); *B60W 2554/4044* (2020.02); *B60W 2554/4046* (2020.02); *B60W 2554/801* (2020.02); *B60W 2556/10* (2020.02); *B60W 2720/106* (2013.01); *B60W 2720/125* (2013.01); *G07C 5/02* (2013.01)

(58) Field of Classification Search
CPC ............ B60W 60/0015; B60W 30/09; B60W 60/0027; B60W 2520/10; B60W 2520/12; B60W 2554/4044; B60W 2554/4046; B60W 2554/801; B60W 2556/10; B60W 2720/106; B60W 2720/125; G05D 1/0061; G05D 1/0214; G06N 20/00; G07C 5/02
See application file for complete search history.

(56) References Cited

U.S. PATENT DOCUMENTS

| | | | |
|---|---|---|---|
| 8,244,458 B1* | 8/2012 | Blackburn | G08G 1/166 342/174 |
| 10,782,136 B2 | 9/2020 | Adams et al. | |
| 10,981,507 B1* | 4/2021 | Benjamin | B60Q 1/50 |
| 2019/0051179 A1* | 2/2019 | Alvarez | H04W 4/46 |

(Continued)

*Primary Examiner* — Peter D Nolan
*Assistant Examiner* — Ashley L Redhead, Jr.
(74) *Attorney, Agent, or Firm* — Lee & Hayes, P.C.

(57) ABSTRACT

Techniques for predicting safety metrics associated with near-miss conditions for a vehicle, such as an autonomous vehicle, are discussed herein. For instance, a training system identifies an object in an environment and determines a trajectory for the object. The training system may receive a trajectory for a vehicle and associate the trajectory for the object and the trajectory for the vehicle with an event involving the object and the vehicle. In examples, the training system determines a parameter associated with motion of the vehicle as indicated by the trajectory of the vehicle relative to the trajectory of the object, and the event. Then, the training system may determine a safety metric associated with the event that indicates whether the vehicle came within a threshold of a collision with the object during a time period associated with the event.

20 Claims, 6 Drawing Sheets

(56) References Cited

U.S. PATENT DOCUMENTS

| | | | |
|---|---|---|---|
| 2019/0071084 A1* | 3/2019 | Tuncali | B60W 30/165 |
| 2019/0145860 A1* | 5/2019 | Phillips | G01M 17/007 |
| | | | 701/33.9 |
| 2020/0110416 A1 | 4/2020 | Hong et al. | |
| 2020/0174481 A1 | 6/2020 | Van Heukelom et al. | |

* cited by examiner

SAFETY METRIC PREDICTION

BACKGROUND

Various methods, apparatuses, and systems are utilized by autonomous vehicles to guide such autonomous vehicles through environments including various static and dynamic objects. For instance, autonomous vehicles utilize route planning methods, apparatuses, and systems to guide autonomous vehicles through congested areas with other moving vehicles (autonomous or otherwise), moving people, stationary buildings, etc. In some examples, an autonomous vehicle may make decisions while traversing an environment to ensure safety for passengers and surrounding persons and objects, such as to avoid collisions with objects in the surrounding environment. In some instances, a simulated environment may be used to simulate various scenarios for systems of the autonomous vehicle. Whether the autonomous vehicle is traversing a simulated environment or a real-world environment, information regarding collisions with objects that do occur in the environment is valuable in order to make the autonomous vehicle safer on subsequent excursions. Additionally, information regarding near-miss conditions can be useful to make the autonomous vehicle safer.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features, in accordance with examples of the disclosure.

DETAILED DESCRIPTION

Figure 1:
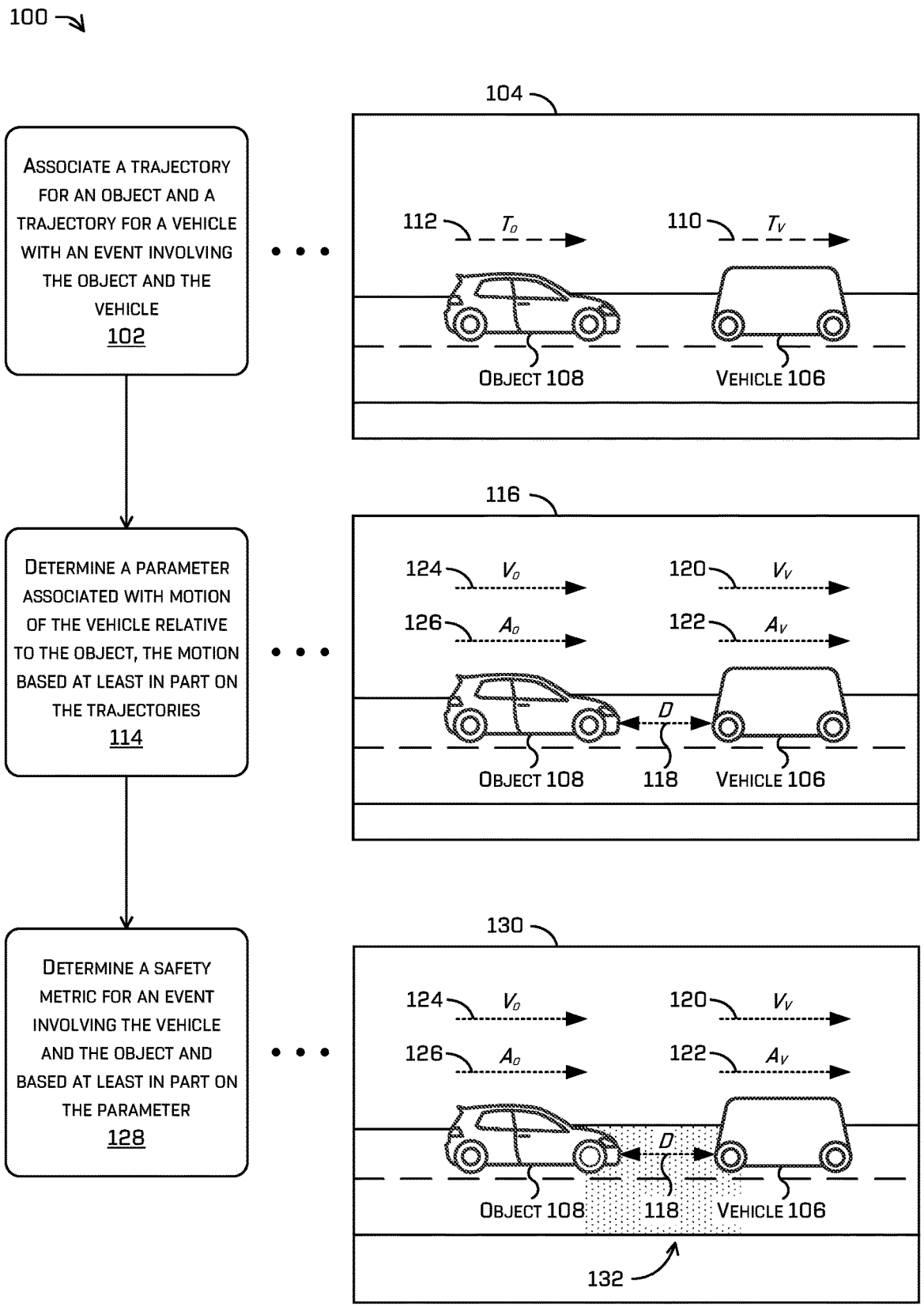
FIG. 1 is a pictorial flow diagram of using a parameter to determine a safety metric for an event involving a vehicle and an object, in accordance with examples of the disclosure.

This disclosure relates to using a machine-learned model to predict safety metrics. In some examples, a safety metric may correspond to a near-miss condition between a vehicle (e.g., an autonomous vehicle) and an object in an environment. For instance, a safety metric that corresponds to a near-miss condition may be is associated with the vehicle coming within a threshold (e.g., a threshold distance) of the object, but a collision fails to occur in a time period (e.g., 2 seconds, 5 seconds, 10 seconds, etc.) associated with an event involving the vehicle and the object. In examples, a vehicle may capture sensor data (e.g., lidar, radar, time of flight, and the like) as the vehicle proceeds through an environment, and may use the sensor data to generate predictions of object behavior. In some examples, the vehicle may utilize a variety of sensor modalities and algorithms to predict behaviors of objects in an environment surrounding the vehicle. The algorithms used to generate such predictions may, in some cases, include machine-learned models. Improving the accuracy of such machine-learned models to predict object behavior can, in some cases, improve safety of the vehicle for passengers, pedestrians, and/or objects in an environment surrounding the vehicle. Furthermore, identifying parameters used to make predictions of safety metrics can improve safety of the vehicle as well.

In some instances, the machine-learned models utilize data related to collisions or other safety related events between the vehicle and objects in an environment (e.g., a real-world environment, a simulated environment, etc.) to improve safety of the vehicle subsequent to a collision. For example, if the vehicle is involved with a tailgate collision with another vehicle, systems used to control the vehicle may be modified to increase a following distance of the vehicle, reduce a speed of the vehicle, increase deceleration of the vehicle, and so forth in similar scenarios in which the collision occurred. However, actual real-world collisions between vehicles and objects in an environment can be relatively infrequent. Therefore, little data may exist involving actual different real-world scenarios that involve collisions to create and/or refine machine-learned models for improving safety of the vehicle. Although many different scenarios may be simulated, it may be important for the scenarios to be representative of a scenario that may occur in the real-world. Otherwise, if this data is used for training of evaluation of autonomous vehicle software, the training or evaluation may not be valid for real-world scenarios. Accordingly, utilizing data related to near-miss condition events may improve safety of the vehicle and further reduce the chance of a collision occurring. However, it may be difficult to determine what events in the real-world represent a near-miss or other safety-related condition for simulation and/or training of software for an autonomous vehicle.

In some examples, autonomous and/or semi-autonomous vehicles traverse real-world environments, where a driver (or passenger) in the vehicle tags events associated with a near-miss condition. While these tags can be helpful in identifying near-miss conditions, different drivers or passengers may tag different events as "near-misses," resulting in inconsistencies in the tagged data. Additionally, humans may be limited in their ability to perceive a scenario and a near-miss condition may have occurred that a passenger (or observer) was unable to identify (e.g., a view of colliding object was blocked). It may also be difficult for software-based solutions to be able to identify a near-miss or other safety related event because such an event (and metrics corresponding to such an event) may be difficult to define, especially when a binary indicative condition of a safety related event (e.g., a collision) has not occurred. Accurate and consistent systems for identifying and tagging near-miss conditions, both in real-world and simulated environments, are needed to improve safety of autonomous and semi-autonomous vehicles.

The described techniques can determine parameters from object and vehicle trajectories that are indicative of safety metrics such as collisions, near-miss conditions, and other safety related events. Additionally, in some cases, the described techniques can use near-miss condition events to determine additional parameters that may be further indicative of near-miss conditions. Using the disclose techniques, a vehicle can be configured to maneuver more safely, efficiently, and with greater accuracy to prevent safety critical events (e.g., a collision with an object) than in previous techniques.

For instance, an autonomous vehicle may receive sensor data of an environment (e.g., a real-world environment, a simulated environment, etc.) as the autonomous vehicle operates in the environment. In some cases, a perception system of the autonomous vehicle may receive the sensor data and use the sensor data to determine a parameter associated with motion of the autonomous vehicle relative to an object in the environment. A parameter may include one or more of an estimated time to a collision between the autonomous vehicle and the object, a deceleration required to avoid the collision between the autonomous vehicle and the object, a lateral distance between the autonomous vehicle and the object, a speed of the autonomous vehicle, a proportion of stopping distance corresponding to the distance remaining to a potential point of collision and a minimum acceptable stopping distance, an estimated lateral distance associated with an unexpected maneuver by the object, and so forth.

For instance, the perception system may use the sensor data to detect an object in the environment. Objects may include, but are not limited to, pedestrians, vehicles, bicycles, animals, trains, and the like. In some cases, the perception system may determine motion of the object in the environment, such as velocity of the object, acceleration of the object, a location of the object, and so on. A prediction system of the autonomous vehicle may use the motion detected by the perception system to predict a future trajectory for the object. Details regarding generating predictions of object trajectories, such as by using a top-down representation of an environment, can be found in relation to U.S. Pub. No. 2020/0110416 A1, which is incorporated by reference herein in its entirety for all purposes.

The perception system may also receive information relating to a trajectory of the autonomous vehicle, such as from a planning system of the autonomous vehicle. Details regarding generation of a trajectory to navigate an environment using map data and/or sensor data can be found in relation to U.S. Pat. No. 10,782,136, which is incorporated by reference herein in its entirety for all purposes. Using the trajectory of the autonomous vehicle, the perception system may determine motion of the autonomous vehicle, such as velocity information, acceleration information, location information, and so forth. In some examples, the perception system may associate the trajectory for the object and the trajectory for the autonomous vehicle with an event involving the object and the autonomous vehicle. As used herein, an "event" may be a period of time (e.g., 3 seconds, 10 seconds, 30 seconds, 1 minute, etc.) in which the autonomous vehicle and an object are within a threshold distance (e.g., 10 meters, 30 meters, 50 meters, etc.) of each other in the environment. In some cases, the period of time may vary based on the threshold distance associated with the parameter. In an illustrative example, the autonomous vehicle may be passing the object (e.g., another vehicle) on a highway. In such an example, the perception system may determine a lateral distance between the autonomous vehicle and the object (e.g., the parameter) while the autonomous vehicle passes the other vehicle on the highway, where the period of time begins when the autonomous vehicle is 10 meters behind the other vehicle and ends when the autonomous vehicle is 10 meters in front of the other vehicle.

The prediction system may use the information related to the object (e.g., trajectory information) and the information related to motion of the autonomous vehicle as indicated by the trajectory of the autonomous vehicle relative to the object, to determine the parameter. For example, the prediction system may determine a discretized probability distribution associated with prediction probabilities of the object, and use the discretized probability distribution to evaluate the trajectory for the autonomous vehicle as described in relation to U.S. Pub. No. 2020/0174481 A1, which is incorporated by reference herein in its entirety for all purposes. The prediction system may also use the time associated with the event involving the autonomous vehicle and the object (e.g., based on the predicted trajectories of each) to determine the parameter. For example, the prediction system may determine a future time at which at least a portion of the event involving the autonomous vehicle and the object is likely to occur, and use the future time to determine the parameter. In an example in which the prediction system is determining an estimated time to collision parameter for the autonomous vehicle and the object, the prediction system may determine a difference between the velocity of the object and the velocity of the autonomous vehicle divided by a change in the distance over a time associated with the event.

In some cases, the perception system determines a safety metric for the event based at least in part on the parameter. As described above, a safety metric may indicate a near-miss condition between the autonomous vehicle and the object. A safety metric that corresponds to a near-miss condition may be associated with a likelihood of a collision between the vehicle and the object, where the collision fails to occur in a time period (e.g., 2 seconds, 5 seconds, 10 seconds, etc.) associated with the event involving the vehicle and the object. Because different events may have different durations (e.g., based on a speed of the autonomous vehicle, a speed of the object, and so forth), the time period associated with an event may include the duration of the event with a predefined buffer, such as 5 seconds, before and/or after the event has concluded. Using the illustrative example above of the autonomous vehicle passing the other vehicle on the highway, if the event duration is 10 seconds, the perception system may add 2 seconds before and after the event to determine whether a collision has occurred, thus resulting in a time period of 14 seconds. If no collision occurs between the autonomous vehicle and the object, the perception system (or a user analyzing data recorded in association with the autonomous vehicle traversing the environment) may determine whether the safety metric is associated with a near-miss condition. For instance, if the lateral distance in the highway passing example above is less than a threshold amount (e.g., 2.5 meters), the perception system may determine the safety metric is associated with a near-miss condition; otherwise, the perception system may determine that the safety metric is associated with a safe event.

In some examples, a training system may utilize and/or refine a machine-learned model (e.g., an XGBoost, gradient boosting, or other classifier) to predict the safety metric associated with the parameter. For instance, the training system may input the parameter into a machine-learned model, and receive a predicted safety metric from the machine learned model. When utilizing the machine-learned model to predict safety metrics, the training system may flag collisions, near-miss conditions, and/or safe events in log data. By flagging safety-critical events such as near-miss conditions, the training system can identify such events in simulation without requiring users to review an entirety of a simulation to identify safety-critical events. Additionally, flagging safety-critical events such as near-miss conditions may improve vehicle software by altering a trajectory for a vehicle to account for parameters indicative of safety metrics. To increase the accuracy of the predictions made by the model, the training system may compare the predicted safety metric received from the machine-learned model with a ground-truth safety metric associated with the event, such as after a flagged event has been reviewed by a user.

Alternatively or additionally, the training system may determine parameters that are indicative of near-miss conditions that were previously unknown to the training system, such as by using an unsupervised or semi-supervised machine-learned model (e.g., a neural network). For example, the training system may determine a safety metric for an event involving the autonomous vehicle and an object in an environment (e.g., as labeled in log data), along with determining a first parameter associated with the safety metric. The first parameter may be a known parameter to the training system, such as any of the parameters mentioned above or described below. The training system may input sensor data associated with the event, and the safety metric, into the machine-learned model. In some examples, the training system receives a second parameter for the event that is different from the first parameter, and in some cases, may not have been known as an indicator of near-miss conditions. In some cases, the training system may use the second parameter to predict near-miss conditions and/or to refine a machine-learned model such as an gradient boosting classifier, as described above. Further, the perception system of the autonomous vehicle may leverage the second parameter to control the autonomous vehicle to traverse an environment (e.g., along with the first parameter), thus increasing safety of the autonomous vehicle by accounting for previously unknown parameters that are indicative of near-miss conditions.

The techniques discussed herein can improve a functioning of a computing device in a number of ways. The predictions of safety metrics and determinations of previously unknown parameters associated with safety metrics can enable the autonomous vehicle to make decisions on how to proceed through the environment earlier and with greater confidence. Additionally, a planning component of the autonomous vehicle can provide a more confident trajectory that accounts for predicted safety metrics, as the parameters provide safety measures based on not only collisions, but near-miss conditions as well. The training system may determine predictions of safety metrics and determinations of previously unknown parameters associated with safety metrics in simulated environments in addition to real-world environments. By identifying parameters that accurately indicate safety metrics, the training system may execute authentic simulations using the parameters, and thus the need for real-world data collection by a vehicle is reduced.

The disclosed techniques can be used to determine certain parameters associated with a safety critical or related event. These parameters may be inferred or otherwise calculated from sensor data associated with vehicle. Through the use of the disclosed techniques, safety related events can be consistently and accurately detected. Log information (e.g., vehicle sensor data or internal software state information) related to the safety related events can be collected based on the identification of safety related events and used for simulations, training, or other purposes. Although some safety related events can be determined by detecting a collision, other, such as near-mission conditions, may not be so easily identified or consistently. Furthermore, collisions may occur relatively infrequently in real-world environments, thus collecting log data corresponding to real-world collision data may be sparse. Identification or near-miss or other safety related events can provide a more rich and extensive data set to improve autonomous vehicle related operations.

By controlling the vehicle based in part on safety metrics associated with near-miss conditions, the safety of the autonomous vehicle can be improved by making trajectory decisions that account for near-miss conditions and reduce their frequency and severity. Further, techniques for controlling the vehicle based in part on safety metrics associated with near-miss conditions can increase a confidence that the vehicle can avoid collisions with objects and/or pedestrians by determining the behaviors earlier and with greater accuracy, which may improve safety outcomes, performance, and/or accuracy. These and other improvements to the functioning of an autonomous vehicle are discussed herein.

The techniques described herein can be implemented in a number of ways. Example implementations are provided below with reference to the following figures. Although discussed in the context of an autonomous vehicle, the methods, apparatuses, and systems described herein can be applied to a variety of systems (e.g., a sensor system or a robotic platform), and is not limited to autonomous vehicles. In one example, similar techniques may be utilized in driver-controlled vehicles in which such a system may provide an indication to a driver of the vehicle of whether it is safe to perform various maneuvers. In another example, the techniques can be utilized in an aviation or nautical context, or in any system involving objects or entity that may be associated with behavior that is unknown to the system. As described herein, the techniques described herein can be used with real data (e.g., captured using sensor(s)), simulated data (e.g., generated by a simulator), or any combination of the two.

FIG. 1 is a pictorial flow diagram 100 of using a parameter to determine a safety metric for an event involving a vehicle and an object, in accordance with examples of the disclosure.

An operation 102 includes associating a trajectory for an object and a trajectory for a vehicle (e.g., an autonomous vehicle) with an event involving the object and the vehicle. In some examples, a perception system of a vehicle may receive sensor data, and use the sensor data to identify objects in the environment and characteristics of the objects (e.g., object type, location, velocity, acceleration, pose, and so forth). A prediction system of the vehicle may use the motion detected by the perception system to predict a future trajectory for the object. Details regarding generating predictions of object trajectories, such as by using a top-down representation of an environment, can be found in relation to U.S. Pub. No. 2020/0110416 A1, which is incorporated by reference herein in its entirety for all purposes.

In some instances, the perception system may receive information from various systems of the vehicle (e.g., sensors, drive systems, localization systems, etc.) related to motion of the vehicle in the environment. The perception system may also receive information relating to a trajectory of the vehicle, such as from a planning system of the vehicle. Details regarding generation of a trajectory to navigate an environment using map data and/or sensor data can be found in relation to U.S. Pat. No. 10,782,136, which is incorporated by reference herein in its entirety for all purposes. Using the trajectory of the vehicle and information from the various sensor systems, the perception system may determine motion of the vehicle at a current time and probabilities related to motion of the vehicle at a future time, such as velocity information, acceleration information, location information, and so forth. In some examples, the perception system may associate the trajectory for the object and the trajectory for the vehicle with an event involving the object and the vehicle. As used herein, an "event" may be a period of time (e.g., 3 seconds, 10 seconds, 30 seconds, 1 minute, etc.) in which the vehicle and the object are within a threshold distance (e.g., 10 meters, 30 meters, 50 meters, etc.) of each other in the environment. In some cases, the environment may be a real-world environment in which the perception system receives real-world sensor data and information related to motion of the vehicle as the vehicle traverses the real-world environment. Alternatively or additionally, the environment may be a simulated environment in which the perception system receives simulated sensor data and information related to motion of the vehicle as the vehicle traverses the simulated environment.

An example 104 illustrates an environment including a vehicle 106 and an object 108, in this case another vehicle. The vehicle 106 may collect sensor data while the vehicle 106 traverses the environment, such as lidar data, radar data, time of flight (TOF) data, camera images and/or video, and the like. In some cases, the vehicle 106 may determine the presence of the object 108 in the environment based on the sensor data. Additionally, the vehicle 106 may determine a location of the object 108 in the environment, where the location of the object 108 may be relative to the vehicle 106. In examples, the object 108 may be another vehicle in a same lane of traffic as the vehicle 106 in the environment, although examples are considered with objects of other object types, and being at different locations in the environment.

The example 104 also indicates a trajectory 110 for the vehicle 106 (indicated by "$T_v$"), and a trajectory 112 for the object 108 (indicated by "$T_o$"). The trajectory 110 may indicate a path for the vehicle 106 to follow to traverse the environment, where the trajectory 110 may be based on map data associated with the environment and sensor data collected by (or otherwise received by) the vehicle 106 as the vehicle 106 operates in the environment. For instance, the vehicle 106 may receive an initial trajectory based at least in part on map data of the environment, and update the initial trajectory based on objects detected in the environment so that the vehicle 106 proceeds safely through the environment. The trajectory 112 may be a predicted trajectory for the object 108 that a prediction system of the vehicle generates based at least in part on sensor data related to the object 108 and/or other objects in the environment. For instance, the prediction system may determine the trajectory 112 for the object 108 based on past and/or current velocity, acceleration, pose, and so forth indicated by the sensor data, an object type of the object 108 determined from the sensor data, map data representing the environment, other objects detected in the environment, and so forth.

As described above, an "event" may be a period of time (e.g., 3 seconds, 10 seconds, 30 seconds, 1 minute, etc.) in which the vehicle 106 and the object 108 are within a threshold distance (e.g., 10 meters, 30 meters, 50 meters, etc.) of each other in the environment. In at least some examples, the vehicle 106 associates the trajectory 110 with the event involving the vehicle 106 and the object 108, such as by predicting how the trajectory 110 will be executed during the event. Additionally, in some cases, the vehicle 106 associates the trajectory 112 with the event as well, such as by predicting a likelihood of the trajectory 112 during the event. Such predictions may include a collision between the vehicle 106 and the object 108, a near-miss condition between the vehicle 106 and the object 108, and/or a safe event (e.g., no predicted collision or near-miss condition) based on the trajectory 110 and the trajectory 112.

An operation 114 includes determining a parameter associated with motion of the vehicle relative to the object, where the motion is based at least in part on the trajectories. For example, the trajectories associated with the vehicle and the object may be used to determine parameters such as an estimated time to a collision between the vehicle and the object, a deceleration required to avoid the collision between the vehicle and the object, a lateral distance between the vehicle and the object, a speed of the vehicle, a proportion of stopping distance corresponding to the distance remaining to a potential point of collision and a minimum acceptable stopping distance, an estimated lateral distance associated with an unexpected maneuver by the object, and so forth. The parameter may also be associated with the event involving the encounter between the vehicle and the object in the environment. For instance, the parameter may be stored in log data in association with the event as an indicator of what was used to determine the safety parameter for the event.

An example 116 indicates various parameters associated with the vehicle 106 and/or the object 108. For instance, the example 116 includes a distance 118 (indicated by "D"), which may correspond to a distance between the vehicle 106 and the object 108. Additionally, the example 116 includes a velocity 120 of the vehicle 106 (indicated by "$V_v$"), and an acceleration 122 of the vehicle 106 (indicated by "$A_v$"). The vehicle 106 may determine the velocity 120 and/or the acceleration 122 based on information provided by sensors, drive systems, localization systems, and so forth of the vehicle 106. In at least some examples, the velocity 120 and/or the acceleration 122 may be determined for the trajectory 110 at a future time as the vehicle 106 plans to follow the trajectory 110.

Further, the example 116 includes a velocity 124 of the object 108 (indicated by "$V_o$"), and an acceleration 126 of the object 108 (indicated by "$A_o$"). The vehicle 106 may determine the velocity 124 and/or the acceleration 126 based on information provided by sensors of the vehicle 106, maps, and so forth. The vehicle 106 may also predict the velocity 124 and/or the acceleration 126 for the trajectory 112 at a future time based on sensor data associated with the object 108. The velocity 120, the acceleration 122, the velocity 124, and/or the acceleration 126 may be initial parameters associated with the trajectory 110 and/or the trajectory 112, which may be used to determine more complex parameters that can be indicative of whether the event involves a collision or a near-miss condition.

For instance, parameters that may be indicative of a collision or a near-miss condition may include one or more of an estimated time to a collision between the vehicle 106 and the object 108, a deceleration required to avoid the collision between the vehicle 106 and the object 108, a lateral distance between the vehicle 106 and the object 108, a speed of the vehicle 106, a proportion of stopping distance corresponding to the distance 118 (to the potential point of collision) and a minimum acceptable stopping distance, an estimated lateral distance associated with an unexpected (e.g., less than a threshold probability, such as less than 1%) maneuver by the object 108, and so forth. Example parameters that may indicate a collision or a near-miss condition may include the following:

| Example Safety Parameters | Example Threshold | Description |
| --- | --- | --- |
| Enhanced Time to Collision with object (ETTC) | <1.5 second | Time required for two objects to collide (e.g., if they continue at their present speed and on the same path. This metric can use delta speed/velocity, distance, and/or acceleration between two objects. The objects can be an autonomous vehicle and an object (e.g., a vehicle or pedestrian) external to the autonomous vehicle. The object can be an object in proximity to a planned future path of the autonomous vehicle. |
| Deceleration Required to Avoid Collision (DRAC) | >3.4 meters/second$^2$ | Necessary deceleration to avoid collisions between an autonomous vehicle and an object (note that the vehicle and/or object can be assumed to continue at their respective present speed and/or path). An autonomous vehicle's planned future speed/path may also be known from a planner component as disclosed herein. |
| Lateral Distance/Vehicle Velocity | 0.5 seconds | Metric to measure lateral distances to an object, (e.g., a pedestrian or vehicle) with respect to vehicle driving speed |
| Proportion of Stopping Distance | <1 | The proportion between the remaining distance to the potential point of collision to a minimum acceptable stopping distance (e.g., 1, 3, 5, 10 meters, etc.). |
| Time Gap (or Distance Gap) to Second Lead Object | $T_{current} > T_{required}$ (or $D_{current} < D_{required}$) | Metric to capture the risk of cut-out scenarios. Compares current time gap to a second object with time required to stop an autonomous vehicle. For example, an object may enter a path of an autonomous vehicle within a distance that the autonomous vehicle may not be able to stop. |
| Longitudinal Acceleration | >3.0 meters/second$^2$ | Indicator for unintended/unexpected acceleration by the object |
| Longitudinal Deceleration | >3.0 meters/second$^2$ | Indicator for harsh braking |
| Lateral Acceleration | >3.0 meters/second$^2$ | Indicator for harsh steering or high cornering speed |

Alternatively or additionally, example parameters that may indicate a collision or a near-miss condition and are associated with the vehicle 106 may include the following:

| Example Autonomous Vehicle Parameters | Example Description |
| --- | --- |
| Vehicle Speed | Vehicle speed in the direction of travel/path (e.g., velocity), can be used for estimating a stopping distance of the vehicle and/or a severity of a possible impact |
| Vehicle Acceleration | Vehicle acceleration in the direction of travel, can be used for determining other metrics such as ETTC |
| Vehicle Jerk | Vehicle jerk in the direction of travel (e.g., longitudinal acceleration or deceleration above a threshold or threshold per unit time) |
| Vehicle Lateral Acceleration | Vehicle lateral acceleration (e.g., acceleration substantially perpendicular or otherwise non-parallel to a direction of travel of the vehicle) |
| Vehicle Stopping Distance | Vehicle stopping distance required to come to a stop given the current vehicle speed. This can assume a certain braking profile (e.g., application of braking force over time and/or for a given speed) |

Alternatively or additionally, example parameters that may indicate a collision or a near-miss condition and are associated with the object 108 may include the following:

| Example Object Parameters | Example Description |
| --- | --- |
| Object Speed | Object speed in the direction of travel, can be used for calculating other metrics herein |
| Object Acceleration | Object acceleration in the direction of travel, can be used for calculating other metrics herein |
| Vehicle and Object Delta Speed | Delta speed or velocity between object and vehicle. This can be instantaneous or over a unit of time. |
| Longitudinal Distance to Object in Front | Longitudinal distance from bumper to bumper between objects (e.g., other vehicles) in front of the vehicle, can be used for calculating other metrics herein |
| Lateral Distance to Object | Lateral distance from side of a side of an autonomous vehicle to an object, can be used to calculate other metrics herein |
| Time to Collision to Object | Longitudinal distance to object in front/Vehicle and Object Delta Speed. Metric for risk while following an object |
| Time Gap to Object | Longitudinal Distance to Object in Front/Vehicle speed, metric for risk while following an object |
| Deceleration of Vehicle Required to Avoid a Collision | Metric using Vehicle and Object Delta Speed and Longitudinal Distance to Object in Front to calculate how much vehicle deceleration is required to avoid a collision |
| Minimal Lateral Distance to Object | Lateral distance to an object (another vehicle or other object types) at a given point in time, used for calculating other metrics herein |
| Metric for Lateral Distance Over Delta Speed | Vehicle Speed/Lateral Distance to Object, used for assessing the risk while passing objects (another vehicle or other object types) |

Other types of information provided by various systems of the vehicle 106 may be used to determine the parameters that may be indicative of a collision or a near-miss condition described above in combination with one or more of the distance 118, velocity 120, the acceleration 122, the velocity 124, the acceleration 126, and so forth. Note that the preceding examples may require that sensor data be gathered corresponding to objects in an environment to determine each object's path in relation to an autonomous vehicle. For example, each object may be classified as a dynamic object in an environment capable of movement, a velocity determined for each object, a pose determined for each object to determine a possible future path of motion, and/or a future possible behavior may be characterized (or several possible future behaviors) in order to determine a likely future path for the object that may cross an autonomous vehicle's planned path. This may be performed for many objects in an environment concurrently. In some examples, an autonomous vehicle's prediction and/or planning capabilities may be leveraged to determine the disclosed calculated parameters, or other as disclosed herein, to identify safety related events.

Although not explicitly pictured in the example 104, other parameters associated with the vehicle 106 may include indications or predictions of a jerk (which may be defined as a threshold acceleration within a threshold time) by the vehicle 106, lateral acceleration (e.g., other than in a direction of travel) by the vehicle 106, stopping distance required to avoid a collision with an object or come to a stop given the velocity 120, and so forth. Other parameters associated with the object 108 that are not explicitly pictured in the example 104 may include a change in velocity between the vehicle 106 and the object 108, a longitudinal distance between the object 108 and another object (e.g., between a bumper of the object 108 and a bumper of another vehicle), a lateral distance between the object 108 and another object (e.g., side-to-side between the object 108 and another vehicle), and so on.

An operation 128 includes determining a safety metric for an event involving the vehicle and the object and based at least in part on the parameter. In at least some examples, a safety metric may indicate a near-miss condition between the vehicle 106 and the object 108. A safety metric that corresponds to a near-miss condition may indicate whether the vehicle 106 came within a threshold of a collision with the object 108, where the collision fails to occur in a time period (e.g., 2 seconds, 5 seconds, 10 seconds, etc.) associated with the event involving the vehicle 106 and the object 108.

The threshold that determines the safety metric of a near-miss condition may be a distance threshold, such as less than 1 meter between the vehicle 106 and the object 108, less than 3 meters between the vehicle 106 and the object 108, less than 5 meters between the vehicle 106 and the object 108, and so forth, where a collision fails to occur between the vehicle 106 and the object 108. In some cases, the distance threshold that defines a near-miss condition may be based at least in part on a speed of the vehicle 106 and/or a speed of the object 108. In an illustrative example, the threshold distance that defines a near-miss condition may be 1 meter if the vehicle 106 and the object 108 are both moving at speeds less than 20 miles per hour, and may increase to a distance of 5 meters if one or more of the vehicle 106 or the object 108 are moving at speeds greater than 50 miles per hour. The vehicle 106 may also determine other safety metrics as well, such as whether a collision occurred (e.g., as indicated by contact between the vehicle 106 and the object 108), or a safe event involving the vehicle 106 and the object 108. In some examples, a combination of parameters may be used as a threshold. For example, a machine-learned or a deterministic model may, based on values of parameters and corresponding weights, determine a safety metric.

In some examples, the vehicle 106 may classify the event as a safe event if the vehicle 106 does not come within the threshold that defines a near-miss condition. In at least some examples, a machine-learned model such as a gradient boosting classifier may determine the safety metric based at least in part on the parameter. The machine-learned model may be trained to output predictions of safety metrics based at least in part on parameters associated with events involving the vehicle 106 and an object, such as the object 108. For instance, a training system may input the parameter into the machine-learned model, and receive a classification of the event involving the vehicle 106 and the object 108 as a safe event, a near-miss condition event, or a collision event. Other classifications are also considered.

To illustrate, an example 130 depicts the environment including a vehicle 106 and an object 108 shown in the example 116, along with the distance 118, the velocity 120, the acceleration 122, the velocity 124, and the acceleration 126. The example 130 also illustrates a representation 132 (e.g., the shaded area) corresponding to a near-miss condition safety metric. In some instances, the representation 132 of the near-miss condition safety metric is determined based at least in part on one or more of the parameters indicative of a near-miss condition, as described above. Because the distance 118, the velocity 120, the acceleration 122, the velocity 124, and/or the acceleration 126 provide a basis for the parameters indicative of a near-miss condition, changing one or more of the distance 118, the velocity 120, the acceleration 122, the velocity 124, and/or the acceleration 126 may cause an area corresponding to the representation 132 to change as well. For instance, if the velocity 124 of the object 108 decreases, the area of the representation 132 may decrease as well, thus reducing a likelihood that the safety metric will correspond to a near-miss condition.

As shown, both the vehicle 106 and the object 108 are within the representation 132 of the safety metric for a near-miss condition. Thus, the event illustrated in the example 130 may be receive a label for a safety metric as a near-miss condition for an event involving the vehicle 106 and the object 108. In examples in which the event takes place in a real-world environment, the event may receive a safety metric for a near-miss condition from a driver and/or passenger of the vehicle 106 and/or the object 108, a human providing remote control of the vehicle 106 and/or the object 108, a human reviewing log data of the route followed by the vehicle 106 and/or the object 108, a training system analyzing log data of the route followed by the vehicle 106 and/or the object 108, and/or a perception system of the vehicle 106 and/or the object 108, to name a few examples. In examples in which the event takes place in a simulated environment, the event may receive safety metric for a near-miss condition from a human reviewing log data of a trajectory followed by the vehicle 106 and/or the object 108, a training system analyzing log data of the route followed by the vehicle 106 and/or the object 108,and/or a perception system of the vehicle 106 and/or the object 108, for instance. In some examples, such human labeled data can be used as ground truth data for training a machine-learned model.

In some cases, a training system may modify parameters of a machine-learned model trained to predict safety metrics based at least in part on a ground-truth safety metric associated with the event. For instance, the training system associated with the vehicle 106 can receive sensor data used to determine the parameter in the operation 114 and/or the parameter itself, and may receive additional data associated with the event as well (e.g., location data for the vehicle 106, system data associated with the vehicle 106, etc.). The training system may include one or more machine-learned models, as described herein. Additionally, the training system is generally described herein as being a system that is implemented in computing device remote from the vehicle 106, although examples are considered in which the training system is incorporated into the vehicle 106. Additional details related to the training system are discussed in relation to FIG. 2 and FIG. 3.

In some examples, the training system may determine a difference between the predicted safety metric and the determined safety metric (e.g., as labeled in log data). In an illustrative example, if the determined safety metric is classified as a near-miss condition and the machine-learned model classifies the predicted safety metric as a safe event, the training system determines a difference between these classifications. The training system may then use the difference to alter one or more parameters of the machine-learned model to minimize the difference between the safety metric and the predicted safety metric. Continuing with the illustrative example above, the training system may weight an input, such as deceleration required to avoid the collision between the autonomous vehicle and the object, based on the difference between the safety metric being classified as a near-miss condition and the predicted safety metric being classified as a safe event. Additional factors may be used to predict safety metrics, and/or other metrics, as well.

In some examples, the training system may track whether the vehicle 106 remained engaged during the event. As used herein, "engaged" corresponds to the vehicle 106 being operated autonomously and without control of a human driver either inside of the vehicle 106 or via remote control. In some examples, disengage events may be indicative of a near-miss condition, such as where a driver detects that a collision may occur and assumes control of the vehicle 106. However, the vehicle 106 may be disengaged from autonomous driving for reasons other than a near-miss condition, such as the driver wanting to take an alternate route and/or wanting to change a destination of the vehicle 106. Therefore, automatically assigning an event as being a near-miss condition based on the presence of a disengage from autonomous driving may result in false-positive safety metrics associated with near-miss conditions. Additionally, in some cases, a driver may not disengage an autonomous vehicle even when a near-miss condition is imminent. Therefore, the training system may determine whether the vehicle 106 remained engaged during a time period (e.g., 10 seconds, 30 seconds, 1 minute, etc.) that includes the event involving the vehicle 106 and the object 108, and store an indication of the vehicle being engaged or disengaged during the time period associated with the event in log data. Such an indication may be used to refine the machine-learned model, such as to determine which disengage events are involved with near-miss conditions, and parameters associated with such disengage events.

Additionally, in some cases, the training system may detect events that are unlabeled as a near-miss condition by a human using the machine-learned model. As mentioned above, a driver (or passenger) in the vehicle 106 may label (or tag) events associated with a near-miss condition. While these labels can be helpful in identifying near-miss conditions, different drivers or passengers may label different events as "near-misses," resulting in inconsistencies in the tagged data. In response to determining that the event is unassociated with a user label that identifies unsafe driving events, the training system may store the event as an unlabeled event with the parameter in log data. Such an unlabeled event may be used in a variety of ways. For instance, the training system may flag the unlabeled event for further review to determine whether the event was not labeled due to user error and/or inconsistencies, or whether the event was improperly classified as a near-miss condition (or other event type) by the machine-learned model. In cases where the event was not labeled due to user error and/or inconsistencies, the training system may provide this information to a user so that discrepancies in labeling by drivers and/or passengers of the vehicle 106 can be corrected. In cases where the event was improperly classified as a near-miss condition (or other event type) by the machine-learned model, the training system can alter parameters of the machine-learned model by providing a proper label.

In examples, the training system may compare real-world safety metrics with simulation safety metrics to refine the machine-learned model and/or refine a simulation for the vehicle 106. For instance, the training system may determine a number of events that the vehicle 106 associates with a parameter during a simulation in which the vehicle 106 operates in a simulated environment. The training system may also determine a number of events that the vehicle 106 associates with the parameter as the vehicle 106 traverses a real-world environment. In some scenarios, the events that are associated with the parameter as the vehicle 106 traverses the real-world environment may be detected when the vehicle 106 is being controlled by a human driver (e.g., inside of the vehicle 106 or remote from the vehicle 106), and/or is driving autonomously. The training system may determine a difference between the number of events associated with the parameter in the simulated environment and the number of events associated with the parameter in the real-world environment. In some examples, training system may use the difference to refine the machine-learned model, such as by modifying the parameters of the machine-learned model to predict safety metrics more similarly to how safety metrics are identified in real-world scenarios. Alternatively or additionally, the training system may modify the simulation of the simulated environment based on the difference. For example, the training system may cause the simulation to introduce more or less events that involve the parameter to more closely match real-world scenarios.

Furthermore, the training system may determine parameters that are indicative of near-miss conditions or other safety metrics that were previously unknown to the training system, such as by using an unsupervised or semi-supervised neural network. For example, the training system may determine a safety metric for an event involving the vehicle 106 and the object 108 based on a first parameter, as described in relation to the operation 114 and the operation 128. The first parameter may be a known parameter to the training system, in that the parameter (including associated rules, equations, and metrics) is stored by the training system and is accessible for use by the machine-learned model(s). The training system may input sensor data associated with the event, and the previously determined safety metric, into the machine-learned model that is trained to identify parameters indicative of near-miss conditions. In some examples, the training system receives a second parameter from the machine-learned model for the event that is different from the first parameter, and in some cases, may not have been previously known as an indicator of near-miss conditions. In this way, the training system is not limited to predetermined parameters that relate motion of the vehicle 106 to objects in the environment when determining safety metrics.

In some instances, the training system may use the second parameter to predict near-miss conditions and/or to refine a machine-learned classifier model such as an gradient boosting classifier. For instance, when the second parameter is identified, the training system may introduce the second parameter to the gradient boosting classifier so that the gradient boosting classifier may use the second parameter when predicting safety metrics. Alternatively or additionally, the second parameter may be provided to users, such as drivers and/or passengers of the vehicle 106 so that the users can identify the parameter as the vehicle 106 traverses a real-world environment.

Figure 2:
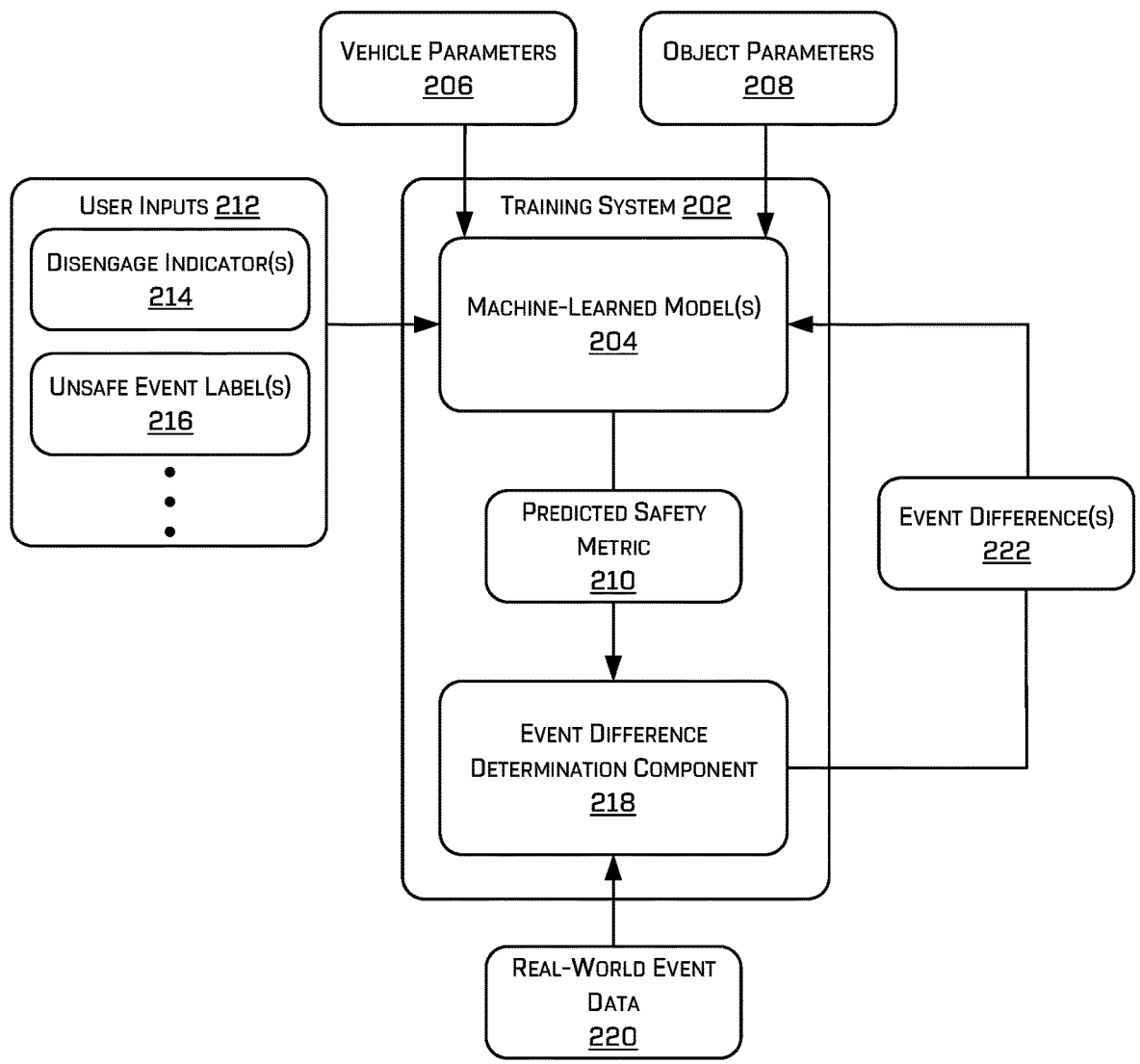
FIG. 2 is an illustration of an example system for using a machine-learned model to determine a safety metric, in accordance with examples of the disclosure.

FIG. 2 is an illustration of an example system 200 for using a machine-learned model to predict a safety metric, in accordance with examples of the disclosure. The example system 200 includes a training system 202, which may be implemented at least partially in hardware of a computing device and is configured to receive data from a vehicle (e.g., the vehicle 106 of FIG. 1) as the vehicle operates in a real-world or simulated environment. As shown, the training system 202 includes one or more machine-learned models 204. The machine-learned models 204 may include a classifier (e.g., an gradient boosting classifier) trained to predict safety metrics based on parameters associated with motion of a vehicle relative to an object in an environment. Alternatively or additionally, the machine-learned models 204 may include an unsupervised and/or semi-supervised neural network trained to identify parameters that may be indicative of safety metrics such as near-miss conditions, as described herein.

In some examples, a machine-learned model 204 of the training system 202 receives vehicle parameters 206 and/or object parameters 208 from a vehicle as the vehicle operates in an environment. The vehicle parameters 206 may correspond to a velocity and/or an acceleration of the vehicle as the vehicle traverses the environment. In some cases, the vehicle parameters 206 may include information relating to the vehicle itself, such as settings, part types, errors, malfunctioning parts, and so forth that may affect performance of the vehicle in avoiding collisions and/or near-miss conditions.

The object parameters 208 may include initial parameters associated with an object, such as an object type, identified object features (e.g., whether another vehicle has a turn signal or brake lights activated, etc.), a velocity and/or an acceleration of the object, and so forth. Additionally, in some instances, the object parameters 208 include more complex parameters associated with an object which may be based on the initial parameters, such as one or more of an estimated time to a collision between the autonomous vehicle and the object, a deceleration required to avoid the collision between the autonomous vehicle and the object, a lateral distance between the autonomous vehicle and the object, a speed of the autonomous vehicle, a proportion of stopping distance corresponding to the distance remaining to a potential point of collision and a minimum acceptable stopping distance, an estimated lateral distance associated with an unexpected maneuver by the object, and so forth. Other object parameters not listed here may be received as well.

In at least one example, the machine-learned model 204 receives the vehicle parameters 206 and the object parameters 208, and outputs a predicted safety metric 210 based at least in part on the vehicle parameters 206 and the object parameters 208. As described herein, the predicted safety metric 210 may be a classification associated with a collision, a near-miss condition, and/or a safe event, to name a few examples. In cases where the predicted safety metric 210 corresponds to a near-miss condition classification, the predicted safety metric 210 may indicate whether the vehicle came within a threshold of a collision between the vehicle and the object (e.g., a distance threshold as described above), where the collision failed to occur within a time period associated with an event involving the vehicle and the object.

In some examples, the training system 202 may refine the predicted safety metric 210 output by the machine-learned model 204 using a variety of additional inputs. For instance, the training system 202 may use log data comprising previously generated sensor data, vehicle parameters, and/or object parameters to refine predictions made by the machine-learned model 204. The log data may comprise recorded events between the vehicle and one or more objects in an environment. In some examples in which a safety metric is received from log data, the safety metric may include a portion of the log data associated with a time the sensor data was captured, and the training system 202 may determine the safety metric and/or a parameter from the log data. To refine the accuracy of the predicted safety metric 210, the training system 202 may determine a difference between the predicted safety metric 210 and the safety metric as labeled in log data. Similar to the example above, if the safety metric is labeled in log data as a near-miss condition and the machine-learned model 204 classifies the predicted safety metric 210 as a safe event, the training system 202 determines a difference between these classifications. The training system 202 may then use the difference to alter one or more parameters of the machine-learned model 204 to minimize the difference between the safety metric as labeled in log data and the predicted safety metric 210. Accordingly, the safety metric as labeled in log data may be used as a ground truth for training the machine-learned model 204.

The training system 202 may also receive one or more user inputs 212 to refine the machine-learned model 204. The user inputs 212 may include, but are not limited to, one or more disengage indicators 214, one or more unsafe event labels 216. The disengage indicators 214 may correspond to a time at which an autonomous vehicle was disengaged from autonomous driving, and taken over by a human driver (e.g., inside of the autonomous vehicle or a remote human driver). The disengage indicators 214 may or may not be associated with a safety metric such as a near-miss condition, but nonetheless may be useful in predicting the safety metric 210. For example, the disengage indicator 214 may include a time of a disengage of an autonomous vehicle along with a label of a safety metric associated with a near-miss condition from log data. In such examples, the machine-learned model 204 may compare parameters that resulted in the near-miss condition label with the vehicle parameters 206 and/or the object parameters 208 to determine if a disengage indicator included in the vehicle parameters 206 was a false positive or false negative indication of a near-miss condition.

The unsafe event labels 216 may correspond to inputs provided by a driver and/or a passenger of a vehicle that indicates that the driver or passenger felt unsafe during an event in the vehicle. Unsafe event labels 216 may or may not be associated with a collision or a near-miss condition. Accordingly, if an event that receives an unsafe event label 216 is automatically recorded as a near-miss condition, accuracy of the machine-learned model 204 may be affected. For example, an unsafe event that receives an unsafe event label 216 may result from a vehicle coming too close to a lateral edge of a roadway, but otherwise was not in danger of a collision or near-miss condition. Although approaching a lateral edge of a roadway may be dangerous, labeling as a near-miss condition may cause the machine-learned model 204 to provide a predicted safety metric 210 that is overly cautious and prevents a vehicle from accomplishing a route. However, events that are labeled with an unsafe event label 216 may receive additional analysis than events that do not receive such a label, in order to determine events that may not otherwise be characterized as a near-miss condition by the machine-learned model 204 in the predicted safety metric 210.

In at least some examples, the training system 202 includes an event difference determination component 218, which can receive the predicted safety metric 210 and determine differences between the predicted safety metric 210 and real-world event data 220. For instance, the real-world event data 220 may include a number of events associated with a particular parameter that were detected within a time period (e.g., 1 minute, 10 minutes, 30 minutes, 1 day, etc.) and/or within a distance traveled by a vehicle (e.g., 1 mile, 10 miles, 50 miles, 100 miles, etc.) as the vehicle traversed a real-world environment. Additionally, the real-world event data 220 may include a number and type of safety metrics that were detected in association with the parameter in the time period and/or in the distance. In some cases, the event difference determination component 218 receives multiple predicted safety metrics (including the predicted safety metric 210) as the vehicle traverses a simulated environment over a corresponding time period and/or distance analyzed in relation to the real-world event data 220. The event difference determination component 218 may determine a difference between the number of instances that the parameter was detected in the real-world event data 220 and the number of instances that the parameter was detected during the simulation in corresponding time periods and/or distances. Additionally, in some examples, the event difference determination component 218 also determines a difference between the number of instances that the safety metric was detected (or labeled) in the real-world event data 220 and the number of instances that the predicted safety metric 210 was detected during the simulation in corresponding time periods and/or distances. The event difference determination component 218 outputs one or more event differences 222 based on the difference between the number of instances that the parameter was detected and/or the difference between the number of instances that the safety metric was detected to the machine-learned model 204.

In examples, the machine-learned model 204 can alter values associated with one or more parameters to minimize the event differences 222. For instance, the machine-learned model 204 can refine an estimated time to collision parameter to be analyzed more or less frequently in the simulated environment to more accurately reflect a number of times the estimated time to collision parameter is observed in the real-world event data 220. Alternatively or additionally, the training system 202 can modify the simulation itself based at least in part on the event differences 222. For example, the training system 202 may determine that there is greater than a threshold number of differences in a particular safety metric (e.g., 5, 10, 100, etc.) as detected in the simulated environment than identified in the real-world event data 220. Based on this determination, the training system 202 may modify events in the simulation to more accurately cause the particular safety metric to be triggered, such as by increasing or decreasing the instances of an object type appearing (e.g., vehicles, pedestrians, bicycles, trains, etc.), altering the behavior of a particular object type in the simulated environment (e.g., making vehicles more aggressive at junctions, making pedestrians less likely to jaywalk, etc.), and the like. In this way, the predicted safety metric 210 along with the real-world event data 220 may make the simulated environment more realistic, thus improving the predicted safety metrics output by the machine-learned model 204 and making the vehicle safer in real-world scenarios.

Figure 3:
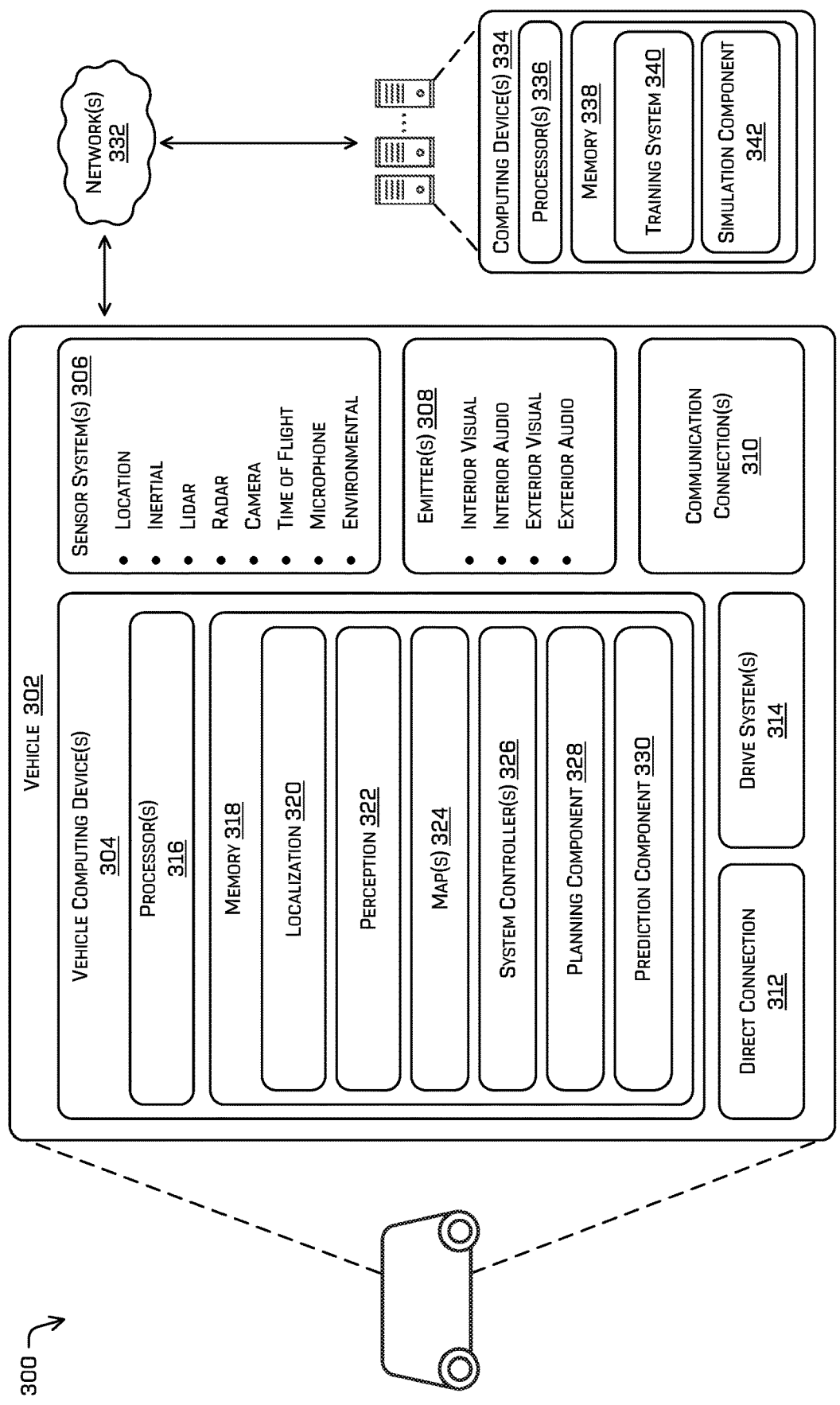
FIG. 3 depicts a block diagram of an example system for implementing the techniques described herein.

FIG. 3 depicts a block diagram of an example system 300 for implementing the techniques described herein. In at least one example, the system 300 can include a vehicle 302, such as an autonomous, semi-autonomous, or manually controlled vehicle. The vehicle 302 can include vehicle computing device(s) 304, one or more sensor systems 306, one or more emitters 308, one or more communication connections 310, at least one direct connection 312, and one or more drive systems 314.

The vehicle computing device(s) 304 can include one or more processors 316 and memory 318 communicatively coupled with the one or more processors 316. In the illustrated example, the vehicle 302 is an autonomous vehicle; however, the vehicle 302 could be any other type of vehicle or robotic platform. In the illustrated example, the memory 318 of the vehicle computing device(s) 304 stores a localization component 320, a perception component 322, one or more maps 324, one or more system controllers 326, a planning component 328, and a prediction component 330. Though depicted in FIG. 3 as residing in the memory 318 for illustrative purposes, it is contemplated that the localization component 320, the perception component 322, the one or more maps 324, the one or more system controllers 326, the planning component 328, and the prediction component 330 can additionally, or alternatively, be accessible to the vehicle 302 (e.g., stored on, or otherwise accessible by, memory remote from the vehicle 302).

In at least one example, the localization component 320 can include functionality to receive data from the sensor system(s) 306 to determine a position and/or orientation of the vehicle 302 (e.g., one or more of an x-, y-, z- position, roll, pitch, or yaw). For example, the localization component 320 can include and/or request/receive a map of an environment and can continuously determine a location and/or orientation of the autonomous vehicle within the map. In some instances, the localization component 320 can utilize SLAM (simultaneous localization and mapping), CLAMS (calibration, localization and mapping, simultaneously), relative SLAM, bundle adjustment, non-linear least squares optimization, or the like to receive image data, lidar data, radar data, time of flight data, IMU data, GPS data, wheel encoder data, and the like to accurately determine a location of the autonomous vehicle. In some instances, the localization component 320 can provide data to various components of the vehicle 302 to determine an initial position of an autonomous vehicle for generating a trajectory, for determining to retrieve map data, and so forth.

In some instances, the perception component 322 can include functionality to perform object detection, segmentation, and/or classification. In some examples, the perception component 322 can provide processed sensor data that indicates a presence of an entity that is proximate to the vehicle 302 and/or a classification of the entity as an entity type (e.g., car, truck, pedestrian, cyclist, animal, building, tree, road surface, curb, sidewalk, stoplight, stop sign, lane marker, unknown, etc.). In additional or alternative examples, the perception component 322 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

In those examples in which perception component 322 performs detection, the perception component 322 may output detections of objects in an image. Such detections may comprise two-dimensional bounding boxes and/or masks of detected objects. In some examples, such detection may utilize a machine learning approach (e.g., scale-invariant feature transform (SIFT), histogram of oriented gradients (HOG), etc.) followed by a support vector machine (SVM) to classify objects depicted in images received from a camera of the sensor system 306. Alternatively or additionally, detection may utilize a deep learning approach based on a convolutional neural network (CNN) to classify objects depicted in images received from a camera of the sensor system 306. As described herein, the perception component 322 may output detections of objects and/or other processed sensor data to the planning component 328 at intervals, thus allowing the planning component 328 to make object predictions and/or generate a trajectory for the vehicle 302 to follow to traverse the environment.

In some cases, the perception component 322 determines parameters associated with objects detected in the environment. For instance, the perception component 322 may initially determine parameters such as velocity of an object, acceleration of an object, distance from the vehicle 302 to the object, and the like. Additionally, the perception component 322 may determine more complex parameters associated with an object which may be based on the initial parameters, such as one or more of an estimated time to a collision between the autonomous vehicle and the object, a deceleration required to avoid the collision between the autonomous vehicle and the object, a lateral distance between the autonomous vehicle and the object, a speed of the autonomous vehicle, a proportion of stopping distance corresponding to the distance remaining to a potential point of collision and a minimum acceptable stopping distance, an estimated lateral distance associated with an unexpected maneuver by the object, and so forth. Further, the perception component 322 may receive information associated with previously unknown parameters that may be indicative of a collision and/or a near-miss condition from the training system 340. The perception system 322 may use the information received from the training system 340 to identify the parameters in subsequent driving routes to reduce the likelihood of collisions and/or near-miss conditions.

The memory 318 can further include one or more maps 324 that can be used by the vehicle 302 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In some examples, a map can include a three-dimensional mesh of the environment. In some instances, the map can be stored in a tiled format, such that individual tiles of the map represent a discrete portion of an environment, and can be loaded into working memory as needed. In at least one example, the one or more maps 324 can include at least one map (e.g., images and/or a mesh). In some examples, the vehicle 302 can be controlled based at least in part on the maps 324. That is, the maps 324 can be used in connection with the localization component 320, the perception component 322, the planning component 328, and/or the prediction component 330, to determine a location of the vehicle 302, identify objects in an environment, and/or generate routes and/or trajectories to navigate within an environment.

In some examples, the one or more maps 324 can be stored on a remote computing device(s) (such as the computing device(s) 334) accessible via network(s) 332. In some examples, multiple maps 324 can be stored based on, for example, a characteristic (e.g., type of entity, time of day, day of week, season of the year, etc.). Storing multiple maps 324 can have similar memory requirements, but increase the speed at which data in a map can be accessed. In some examples, the one or more maps 324 can store sizes or dimensions of objects associated with individual locations in an environment. For example, as the vehicle 302 traverses the environment and as maps representing an area proximate to the vehicle 302 are loaded into memory, one or more sizes or dimensions of objects associated with a location can be loaded into memory as well. In some examples, the one or more maps 324 may include junction extent information, lane merge locations, and the like as described herein.

The prediction component 330 can generate predictions of object behavior based at least in part on sensor data received form the sensor system 306. For example, the prediction component 330 may generate one, or multiple, predicted trajectories for an object detected in the environment. Additionally, in some cases, the prediction component 330 can determine variances in position, location, speed, acceleration, and the like for each predicted trajectory generated for a particular object. The prediction component 330 may output the predicted trajectories to the planning component 328 (e.g., at intervals) to use in generating a trajectory for the vehicle 302 to follow to traverse the environment.

In general, the planning component 328 can determine a path for the vehicle 302 to follow to traverse the environment. For example, the planning component 328 can determine various routes and trajectories and various levels of detail. For example, the planning component 328 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 328 can generate an instruction for guiding the autonomous vehicle along at least a portion of the route from the first location to the second location. In at least one example, the planning component 328 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 302 to navigate. In some examples, the planning component 328 can use temporal logic, such as linear temporal logic and/or signal temporal logic, to evaluate one or more trajectories of the vehicle 302.

In at least one example, the vehicle computing device(s) 304 can include one or more system controllers 326, which can be configured to control steering, propulsion, braking, safety, emitters, communication, and other systems of the vehicle 302. These system controller(s) 326 can communicate with and/or control corresponding systems of the drive system(s) 314 and/or other components of the vehicle 302.

As can be understood, the components discussed herein (e.g., the localization component 320, the perception component 322, the one or more maps 324, the one or more system controllers 326, the planning component 328, and the prediction component 330) are described as divided for illustrative purposes. However, the operations performed by the various components can be combined or performed in any other component. By way of example, functions described in relation to the planning component 328, and/or the prediction component 330 may be performed by the perception component 322 to reduce the amount of data transferred by the system.

In at least one example, the sensor system(s) 306 can include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 306 can include multiple instances of each of these or other types of sensors. For instance, the lidar sensors can include individual lidar sensors located at the corners, front, back, sides, and/or top of the vehicle 302. As another example, the camera sensors can include multiple cameras disposed at various locations about the exterior and/or interior of the vehicle 302. The sensor system(s) 306 can provide input to the vehicle computing device(s) 304. Additionally or alternatively, the sensor system(s) 306 can send sensor data, via the one or more networks 332, to the one or more computing device(s) at a particular frequency, after a lapse of a predetermined period of time, in near real-time, etc.

The vehicle 302 can also include one or more emitters 308 for emitting light and/or sound, as described above. The emitters 308 in this example include interior audio and visual emitters to communicate with passengers of the vehicle 302. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 308 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 302 can also include one or more communication connection(s) 310 that enable communication between the vehicle 302 and one or more other local or remote computing device(s). For instance, the communication connection(s) 310 can facilitate communication with other local computing device(s) on the vehicle 302 and/or the drive system(s) 314. Also, the communication connection(s) 310 can allow the vehicle to communicate with other nearby computing device(s) (e.g., other nearby vehicles, traffic signals, etc.). The communication connection(s) 310 also enable the vehicle 302 to communicate with a remote teleoperations computing device or other remote services.

The communication connection(s) 310 can include physical and/or logical interfaces for connecting the vehicle computing device(s) 304 to another computing device or a network, such as network(s) 332. For example, the communications connection(s) 310 can enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the vehicle 302 can include one or more drive systems 314. In some examples, the vehicle 302 can have a single drive system 314. In at least one example, if the vehicle 302 has multiple drive systems 314, individual drive systems 314 can be positioned on opposite ends of the vehicle 302 (e.g., the front and the rear, etc.). In at least one example, the drive system(s) 314 can include one or more sensor systems to detect conditions of the drive system(s) 314 and/or the surroundings of the vehicle 302. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive system, lidar sensors, radar sensors, etc. Some sensors, such as the wheel encoders can be unique to the drive system(s) 314. In some cases, the sensor system(s) on the drive system(s) 314 can overlap or supplement corresponding systems of the vehicle 302 (e.g., sensor system(s) 306).

The drive system(s) 314 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 314 can include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 314. Furthermore, the drive system(s) 314 also include one or more communication connection(s) that enable communication by the respective drive system with one or more other local or remote computing device(s).

In at least one example, the direct connection 312 can provide a physical interface to couple the one or more drive system(s) 314 with the body of the vehicle 302. For example, the direct connection 312 can allow the transfer of energy, fluids, air, data, etc. between the drive system(s) 314 and the vehicle. In some instances, the direct connection 312 can further releasably secure the drive system(s) 314 to the body of the vehicle 302.

In at least one example, the localization component 320, the perception component 322, the one or more maps 324, the one or more system controllers 326, the planning component 328, and the prediction component 330 can process sensor data, as described above, and can send their respective outputs, over the one or more network(s) 332, to one or more computing device(s) 334. In at least one example, the localization component 320, the perception component 322, the one or more maps 324, the one or more system controllers 326, the planning component 328, and the prediction component 330 can send their respective outputs to the one or more computing device(s) 334 at a particular frequency, after a lapse of a predetermined period of time, in near real-time, etc.

In some examples, the vehicle 302 can send sensor data to one or more computing device(s) 338 via the network(s) 336. In some examples, the vehicle 302 can send raw sensor data to the computing device(s) 338. In other examples, the vehicle 302 can send processed sensor data and/or representations of sensor data to the computing device(s) 338. In some examples, the vehicle 302 can send sensor data to the computing device(s) 338 at a particular frequency, after a lapse of a predetermined period of time, in near real-time, etc. In some cases, the vehicle 302 can send sensor data (raw or processed) to the computing device(s) 338 as one or more log files.

The computing device(s) 334 can include processor(s) 336 and a memory 338 storing a training system 340 and a simulation component 342. In some examples, the training system 340 may correspond to the training system 202 of FIG. 2.

In some instances, the training system 340 can include functionality to train one or more models to detect objects in an environment, predict object behavior, and the like. For instance, aspects of some or all of the components discussed herein can include any models, algorithms, and/or machine learning algorithms. For example, in some instances, the components in the memory 338 (and the memory 318, discussed above) can be implemented as a neural network. In some examples, the training system 340 can utilize a neural network to generate and/or execute one or more models to improve various aspects of object behavior prediction for use in trajectory planning of the vehicle 302.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3(ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

The memory 338 also includes the simulation component 342. In some examples, the simulation component 342 may generate, modify, execute, and document simulations for the vehicle computing devices 304. For instance, the simulation component 342 may generate a simulated environment that includes simulated sensor data which may be provided to the perception component 233, the system controllers 326, the planning component 328, and/or the prediction component 330 via the network 332. The simulation component 342 may receive data via the network 332 from the perception component 233, the system controllers 326, the planning component 328, and/or the prediction component 330 as the vehicle computing devices 304 traverse the simulated environment. In at least some examples, the perception component 322 provides parameters and/or safety metrics associated with collisions and/or near-miss conditions with objects included in the simulated environment to the training component 340, as described herein.

The processor(s) 316 of the vehicle 302 and the processor(s) 336 of the computing device(s) 334 can be any suitable processor capable of executing instructions to process data and perform operations as described herein. By way of example and not limitation, the processor(s) 316 and 336 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 318 and 338 are examples of non-transitory computer-readable media. The memory 318 and 338 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 3 is illustrated as a distributed system, in alternative examples, components of the vehicle 302 can be associated with the computing device(s) 334 and/or components of the computing device(s) 334 can be associated with the vehicle 302. That is, the vehicle 302 can perform one or more of the functions associated with the computing device(s) 334, and vice versa. Further, aspects of the planning component 328 and/or the perception component 322 can be performed on any of the devices discussed herein. For example, any or all of the functionality and components described with reference to FIGS. 1 and 2 can be implemented by the planning component 328 or other components of vehicle 302.

Figure 4:
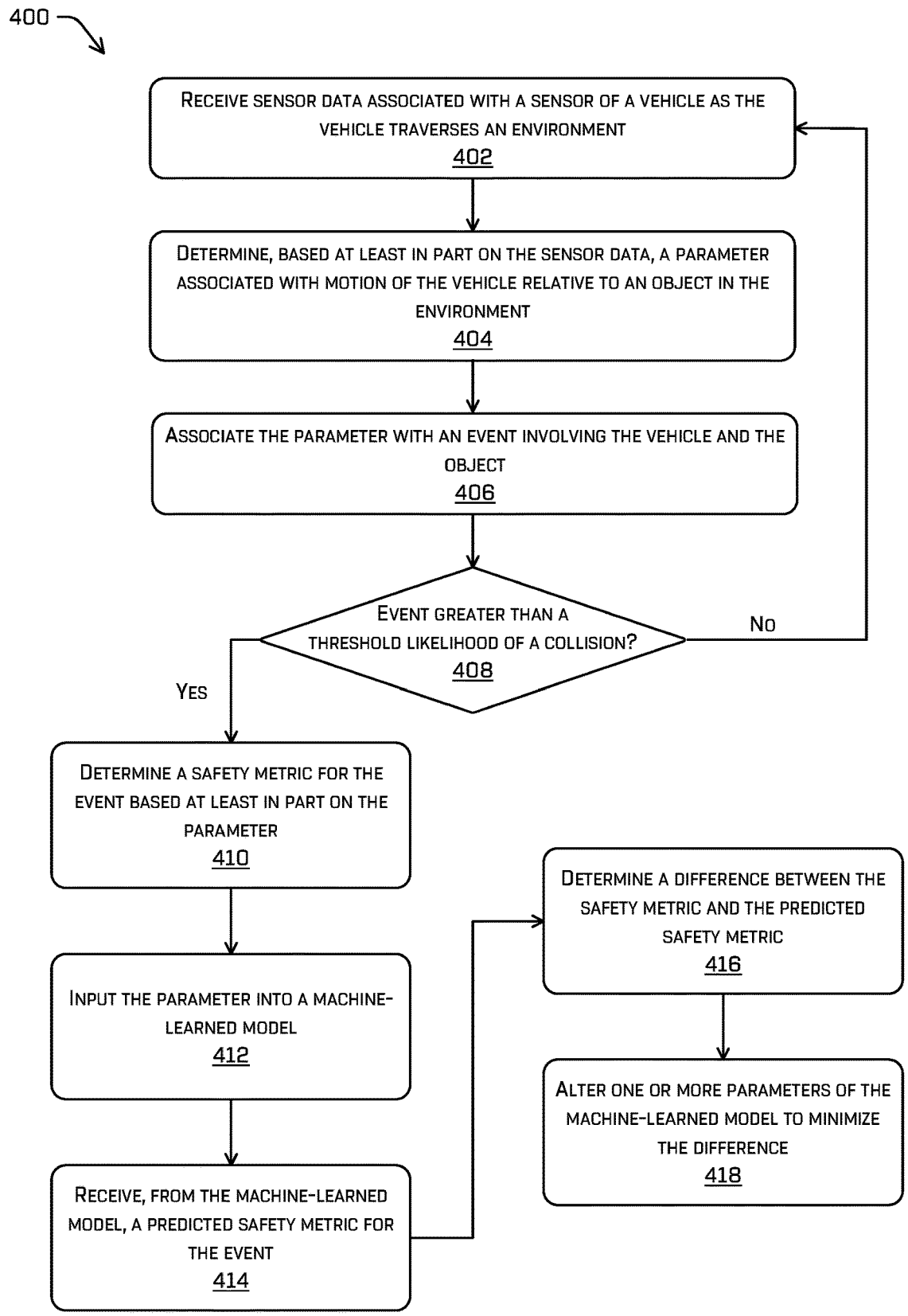
FIG. 4 depicts an example process for using a parameter to determine a safety metric for an event involving a vehicle and an object, and refining a machine-learned model based on the safety metric, in accordance with examples of the disclosure.

FIG. 4 depicts an example process 400 for using a parameter to determine a safety metric for an event involving a vehicle and an object, and refining a machine-learned model based on the safety metric, in accordance with examples of the disclosure. For example, some or all of the process 400 can be performed by one or more components in FIG. 3, as described herein. For instance, some or all of the process 400 can be performed by the vehicle computing device(s) 304, the computing device(s) 334, or any other computing device or combination of computing devices. Further, any of the operations described in the example process 400 may be executed in parallel, in a different order than depicted in the process 400, omitted, combined with the example process 500 of FIG. 5 and/or other processes, and the like.

An operation 402 includes receiving sensor data associated with a sensor of a vehicle as the vehicle traverses an environment. The environment may be a real-world environment or a simulated environment. In examples, sensors such as lidar sensors, radar sensors, time of flight sensors, and the like may be included on the vehicle, which capture corresponding types of sensor data as the vehicle traverses a real-world environment. In some cases, the simulated environment may provide simulated sensor data corresponding to one or more of the lidar sensors, radar sensors, time of flight sensors, and the like to the training system 202.

An operation 404 includes determining, based at least in part on the sensor data, a parameter associated with motion of the vehicle relative to an object in the environment. The parameter may include the vehicle parameters 206 and/or the object parameters 208 from a vehicle as the vehicle traverses an environment. The vehicle parameters 206 may correspond to a velocity and/or an acceleration of the vehicle as the vehicle traverses the environment. In some cases, the vehicle parameters 206 may include information relating to the vehicle itself, such as settings, part types, errors, malfunctioning parts, and so forth that may affect performance of the vehicle in avoiding collisions and/or near-miss conditions.

The object parameters 208 may include initial parameters associated with an object, such as an object type, identified object features (e.g., whether another vehicle has a turn signal or brake lights activated, etc.), a velocity and/or an acceleration of the object, and so forth. Additionally, in some instances, the object parameters 208 include more complex parameters associated with an object which may be based on the initial parameters, such as one or more of an estimated time to a collision between the autonomous vehicle and the object, a deceleration required to avoid the collision between the autonomous vehicle and the object, a lateral distance between the autonomous vehicle and the object, a speed of the autonomous vehicle, a proportion of stopping distance corresponding to the distance remaining to a potential point of collision and a minimum acceptable stopping distance, an estimated lateral distance associated with an unexpected maneuver by the object, and so forth.

An operation 406 includes associating the parameter with an event involving the vehicle and the object. As described above, an event may be a period of time (e.g., 3 seconds, 10 seconds, 30 seconds, 1 minute, etc.) in which the vehicle 106 and the object 108 are within a threshold distance (e.g., 10 meters, 30 meters, 50 meters, etc.) of each other in the environment.

An operation 408 includes determining whether a likelihood of collision associated with the event is greater than a threshold likelihood of a collision between the vehicle and the object. As described above, a safety metric that corresponds to a near-miss condition may be is associated with a likelihood of a collision between the vehicle and the object, but the collision fails to occur in a time period (e.g., 2 seconds, 5 seconds, 10 seconds, etc.) associated with an event involving the vehicle and the object. The likelihood of the collision may be based at least in part on a threshold distance between the vehicle 106 and the object 108. Additionally, the training system 202 may determine the likelihood of a collision between the vehicle 106 and the object 108 based on one or more of the vehicle parameters 206 and/or one or more of the object parameters 208. In some examples, the training system 202 compares the likelihood of the collision between the vehicle 106 and the object 108 to a threshold likelihood (e.g., 10% likelihood, 30% likelihood, 50% likelihood, 90% likelihood, etc.).

If the likelihood of collision associated with the event is less than or equal to the threshold of the collision between the vehicle and the object (e.g., "No" at operation 408), the process 400 may return to the operation 402 and continue to receive sensor data. However, if the likelihood of collision associated with the event is greater than the threshold (e.g., "Yes" at operation 408), the process 400 may proceed to an operation 410 that includes determining a safety metric for the event based at least in part on the parameter. In examples in which the event takes place in a real-world environment, the event may receive safety metric for a near-miss condition from a driver and/or passenger of the vehicle 106 and/or the object 108, a human providing remote control of the vehicle 106 and/or the object 108, a human reviewing log data of the route followed by the vehicle 106 and/or the object 108, a training system analyzing log data of the route followed by the vehicle 106 and/or the object 108, and/or a perception system of the vehicle 106 and/or the object 108, to name a few examples. In examples in which the event takes place in a simulated environment, the event may receive safety metric for a near-miss condition from a human reviewing log data of a trajectory followed by the vehicle 106 and/or the object 108, a training system analyzing log data of the route followed by the vehicle 106 and/or the object 108,and/or a perception system of the vehicle 106 and/or the object 108, for instance. The safety metric received in the operation 410 may be used as a ground truth safety metric for the event.

An operation 412 includes inputting the parameter into a machine-learned model. For example, the training system 202 may input a vehicle parameter 206 and/or an object parameter 208 into the machine-learned model 204, which in some instances is an gradient boosting classifier.

An operation 414 includes receiving, from the machine-learned model, a predicted safety metric for the event. As described herein, the predicted safety metric 210 may be a classification associated with a collision, a near-miss condition, and/or a safe event, to name a few examples. In cases where the predicted safety metric 210 corresponds to a near-miss condition classification, the predicted safety metric 210 may indicate whether the vehicle came within the threshold of collision (e.g., based on distance) with the object, where the collision fails to occur within a time period associated with an event involving the vehicle and the object.

An operation 416 includes determining a difference between the safety metric and the predicted safety metric. For example, if the determined safety metric is classified as a near-miss condition (e.g., as a ground truth in log data) and the machine-learned model 204 classifies the predicted safety metric 210 as a safe event, the training system 202 determines a difference between these classifications. Alternatively or additionally, if the predicted safety metric 210 is associated with a likelihood of collision between the vehicle and the object, the training system 202 may determine a difference between a likelihood of collision as labeled in log data and the predicted likelihood of collision associated with the predicted safety metric 210.

An operation 418 includes altering one or more parameters of the machine-learned model to minimize the difference. For instance, if the determined safety metric is classified as a near-miss condition as a ground truth, and the machine-learned model 204 classifies the predicted safety metric 210 as a safe event, the training system 202 determines a difference between these classifications. The training system 202 may then use the difference to alter one or more parameters of the machine-learned model 204 to minimize the difference between the determined safety metric and the predicted safety metric 210. Continuing with the illustrative example above, the training system 202 may weight an input parameter, such as deceleration required to avoid the collision between the autonomous vehicle and the object, based on the difference between the ground truth safety metric being classified as a near-miss condition and the predicted safety metric 210 being classified as a safe event.

Figure 5:
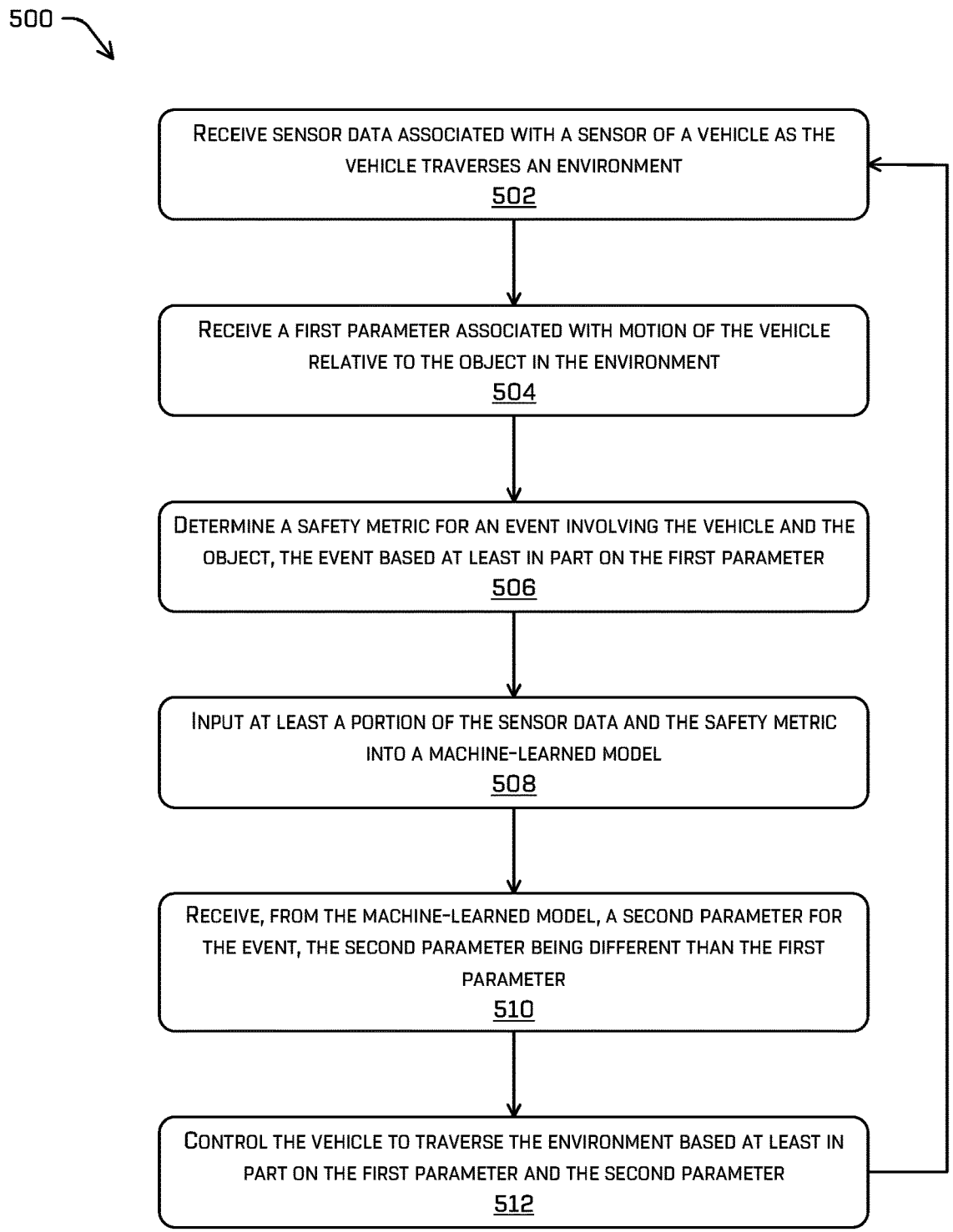
FIG. 5 depicts an example process for determining a new parameter indicative of a safety metric, in accordance with examples of the disclosure.

FIG. 5 depicts an example process 500 for determining a new parameter indicative of a safety metric, in accordance with examples of the disclosure. For example, some or all of the process 500 can be performed by one or more components in FIG. 3, as described herein. For instance, some or all of the process 500 can be performed by the vehicle computing device(s) 304, the computing device(s) 334, or any other computing device or combination of computing devices. Further, any of the operations described in the example process 500 may be executed in parallel, in a different order than depicted in the process 500, omitted, combined with the example process 400 of FIG. 4, the example process 600 of FIG. 6, and/or other processes, and the like.

An operation 502 includes receiving sensor data associated with a sensor of a vehicle as the vehicle traverses an environment. Similar to the discussion above, the environment may be a real-world environment or a simulated environment. In examples, sensors such as lidar sensors, radar sensors, time of flight sensors, and the like may be included on the vehicle, which capture corresponding types of sensor data as the vehicle traverses a real-world environment. In some cases, the simulated environment may provide simulated sensor data corresponding to one or more of the lidar sensors, radar sensors, time of flight sensors, and the like to the training system 202.

An operation 504 includes receiving a first parameter associated with motion of the vehicle relative to the object in the environment. The first parameter may be a known parameter to the training system 202, and may include the vehicle parameters 206 and/or the object parameters 208 from a vehicle as the vehicle traverses an environment. The vehicle parameters 206 may correspond to a velocity and/or an acceleration of the vehicle as the vehicle traverses the environment. In some cases, the vehicle parameters 206 may include information relating to the vehicle itself, such as settings, part types, errors, malfunctioning parts, and so forth that may affect performance of the vehicle in avoiding collisions and/or near-miss conditions.

The object parameters 208 may include initial parameters associated with an object, such as an object type, identified object features (e.g., whether another vehicle has a turn signal or brake lights activated, etc.), a velocity and/or an acceleration of the object, and so forth. Additionally, in some instances, the object parameters 208 include more complex parameters associated with an object which may be based on the initial parameters, such as one or more of an estimated time to a collision between the autonomous vehicle and the object, a deceleration required to avoid the collision between the autonomous vehicle and the object, a lateral distance between the autonomous vehicle and the object, a speed of the autonomous vehicle, a proportion of stopping distance corresponding to the distance remaining to a potential point of collision and a minimum acceptable stopping distance, an estimated lateral distance associated with an unexpected maneuver by the object, and so forth.

An operation 506 includes determining a safety metric for an event involving the vehicle and the object, where the event is based at least in part on the first parameter. As described above, a safety metric that corresponds to a near-miss condition may indicate whether the vehicle came within a threshold of a collision with the object, but the collision fails to occur in a time period (e.g., 2 seconds, 5 seconds, 10 seconds, etc.) associated with an event involving the vehicle and the object. Further, an event may be a period of time (e.g., 3 seconds, 10 seconds, 30 seconds, 1 minute, etc.) in which the vehicle 106 and the object 108 are within a threshold distance (e.g., 10 meters, 30 meters, 50 meters, etc.) of each other in the environment. In examples in which the event takes place in a real-world environment, the event may receive safety metric for a near-miss condition from a driver and/or passenger of the vehicle 106 and/or the object 108, a human providing remote control of the vehicle 106 and/or the object 108, a human reviewing log data of the route followed by the vehicle 106 and/or the object 108, a training system analyzing log data of the route followed by the vehicle 106 and/or the object 108, and/or a perception system of the vehicle 106 and/or the object 108, to name a few examples. In examples in which the event takes place in a simulated environment, the event may receive safety metric for a near-miss condition from a human reviewing log data of a trajectory followed by the vehicle 106 and/or the object 108, a training system analyzing log data of the route followed by the vehicle 106 and/or the object 108,and/or a perception system of the vehicle 106 and/or the object 108, for instance. Alternatively or additionally, a predicted safety metric may be determined by the machine-learned model 204, such as a classification (e.g., safe event, near-miss condition, collision, etc.) provided by a gradient boosting classifier.

An operation 508 includes inputting at least a portion of the sensor data and the safety metric into a machine-learned model. In at least some examples, the training system 202 inputs at least a portion of the sensor data and the safety metric into an unsupervised or semi-supervised neural network. The unsupervised or semi-supervised neural network may be trained to determine parameters that are indicative of safety metrics, such as near-miss conditions, that may be previously unknown to the training system 202.

An operation 510 includes receiving, from the machine-learned model, a second parameter for the event, where the second parameter is different than the first parameter. For instance, the training system 202 receives a second parameter for the event that is different from the first parameter, and in some cases, may not have been known as an indicator of near-miss conditions. In some cases, the training system 202 may use the second parameter to predict near-miss conditions and/or to refine a machine-learned model such as a gradient boosting classifier, as described above.

An operation 512 includes controlling the vehicle to traverse the environment based at least in part on the first parameter and the second parameter. For example, the training system 202 may identify modifications of actions taken by the vehicle 106 associated with parameters that may reduce the likelihood of an occurrence of a near-miss condition. In at least some examples, the perception system of the vehicle 106 may leverage the second parameter to control the vehicle 106 to traverse an environment (e.g., along with the first parameter), thus increasing safety of the vehicle 106 by accounting for previously unknown parameters that are indicative of near-miss conditions.

Figure 6:
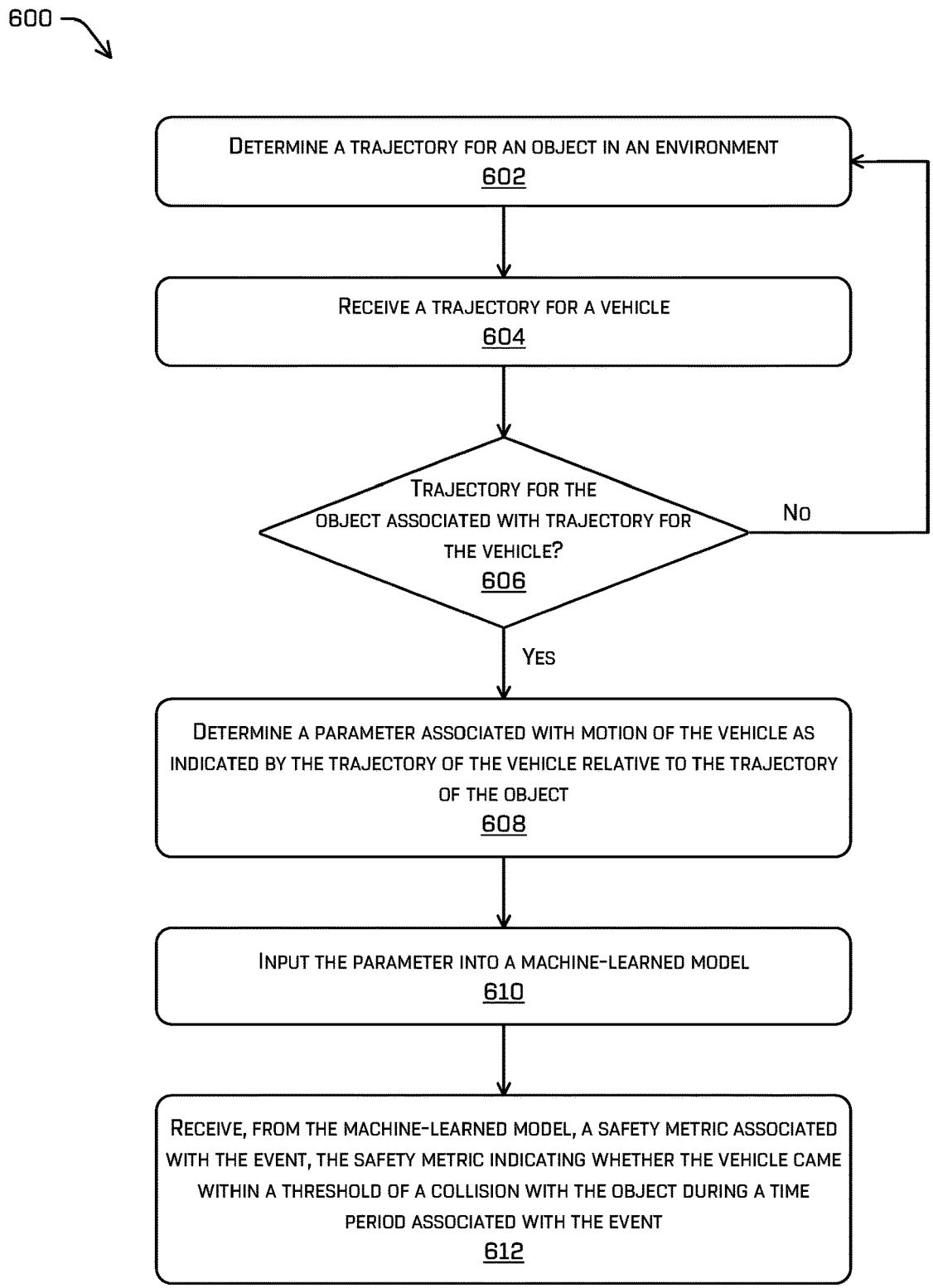
FIG. 6 depicts an example process for using a trajectory for an object and a trajectory for a vehicle to determine a parameter for an event involving the object and the vehicle, and using the parameter to determine a safety metric, in accordance with examples of the disclosure.

FIG. 6 depicts an example process 600 for using a trajectory for an object and a trajectory for a vehicle to determine a parameter for an event involving the object and the vehicle, and using the parameter to determine a safety metric, in accordance with examples of the disclosure. For example, some or all of the process 600 can be performed by one or more components in FIG. 3, as described herein. For instance, some or all of the process 600 can be performed by the vehicle computing device(s) 304, the computing device(s) 334, or any other computing device or combination of computing devices. Further, any of the operations described in the example process 600 may be executed in parallel, in a different order than depicted in the process 600, omitted, combined with the example process 400 of FIG. 4, the example process 500 of FIG. 5, and/or other processes, and the like.

An operation 602 includes determining a trajectory for an object in an environment. For example, determining the trajectory may be based at least in part on receiving sensor data associated with the environment and providing at least part of the sensor data or perception data determined from the sensor data to a machine-learned model trained to determine a current and/or predicted trajectory associated with the object. In an additional or alternate example, the machine-learned model may output a set of frames, wherein each frame is associated with a different time step from a current time up to a time horizon in the future. A frame of output associated with a current time may indicate a current position, velocity, acceleration, heading, or the like associated with the object. A frame of output associated with a future time may indicate a predicted velocity, acceleration, heading, or the like associated with the object. In some examples, the frame may include a top-down representation of the environment and may include a multi-dimensional data structure (e.g., different dimensions may be associated with different characteristics determined in association with the object, such as position, velocity, etc.). In yet another example, one or more machine-learned models may be configured to identify a subset of sensor data associated with an object in the environment. For example, different machine-learning pipelines may be associated with different sensor types, any of which may output an indication of a portion of the respective sensor data that is associated with an object.

An operation 604 includes receiving a trajectory for the vehicle. For example, the trajectory may be a trajectory output by a planning component 328 of the vehicle (e.g., instructions for actuating drive system(s) of the vehicle, a target curvature and acceleration(s)) and/or a trajectory determined based at least in part on data received from wheel encoder(s), a localization component, or another component of the vehicle that estimates the trajectory effectuated by controlling operation of the drive system(s) of the vehicle.

An operation 606 includes determining whether the trajectory for the object is associated with the trajectory for the vehicle. For example, the trajectory for the object may be associated with the trajectory for the vehicle if the trajectories may result in a collision or a near-miss condition. The operation 606 may include detecting an event involving the object and the autonomous vehicle, which may comprise providing data determined at operation 602 and/or 604, sensor data, and/or perception data to a machine-learned model configured to determine whether a collision or near-miss is likely. In some examples, the machine-learned model may output a likelihood, such as a posterior probability, that a collision or near-miss will occur if the state of the object and/or the vehicle remain the same.

If operation 606 results in determining that the trajectory for the object is not associated with the trajectory of the vehicle and/or if an event associated with the respective trajectories is not detected (e.g., "No" at operation 606), the process 600 may return to the operation 602. For example, returning to operation 602 may be associated with a next time step, e.g., a next point in time at which sensor data is received and an object and its trajectory are detected by the vehicle.

If operation 606 results in determining that the trajectory for the object is associated with the trajectory of the vehicle and/or an event associated with the respective trajectories is detected (e.g., "Yes" at operation 606), the process 600 may continue to operation 608.

An operation 608 includes determining a parameter associated with motion of the vehicle as indicated by the trajectory of the vehicle relative to the trajectory of the object. For example, the parameter may include one or more of an estimated time to a collision between the autonomous vehicle and the object, a deceleration required to avoid the collision between the autonomous vehicle and the object, a lateral distance between the autonomous vehicle and the object, a speed of the autonomous vehicle, a proportion of stopping distance corresponding to the distance remaining to a potential point of collision and a minimum acceptable stopping distance, an estimated lateral distance associated with an unexpected maneuver by the object, and so forth. In at least one example, a set of parameters may be determined comprising any of the parameters discussed above. The set of parameters may be augmented with sensor data and/or perception data in yet another example where the sensor data and/or perception data associated with the object is included in a data structure comprising the set of parameters.

An operation 610 includes inputting the parameter into a machine-learned model. For example, operation 610 may comprise providing a parameter, a set of parameters, and/or a data structure comprising one or more parameters, sensor data, and/or perception data to the machine-learned model. Providing any such data to the machine-learned model may comprise transmitting such data via an application programming interface (API) to input node(s) of the machine-learned model.

An operation 612 includes receiving, from the machine-learned model, a safety metric associated with the event, the safety metric indicating whether the vehicle came within a threshold of a collision with the object during a time period associated with the event. An "event" may be a period of time (e.g., 3 seconds, 10 seconds, 30 seconds, 1 minute, etc.) in which the autonomous vehicle and the object are within a threshold distance (e.g., 10 meters, 30 meters, 50 meters, etc.) of each other in the environment. In some cases, the period of time may vary based on the threshold distance associated with the parameter. A safety metric received from the machine-learned model may indicate a near-miss condition between the autonomous vehicle and the object. A safety metric that corresponds to a near-miss condition may be is associated with a likelihood of a collision between the vehicle and the object, where the collision fails to occur in a time period (e.g., 2 seconds, 5 seconds, 10 seconds, etc.) associated with the event involving the vehicle and the object. Because different events may have different durations (e.g., based on a speed of the autonomous vehicle, a speed of the object, and so forth), the time period associated with an event may include the duration of the event with a predefined buffer, such as 5 seconds, before and/or after the event has concluded. In some examples, the output of the machine-learned model may be a probability distribution associated with a time segment of the event. For example, one or more probability distributions may be output by the machine-learned model depending on the length of time associated with the event.

EXAMPLE CLAUSES

A. A system comprising: one or more processors; and one or more non-transitory computer-readable media storing instructions that, when executed, cause the one or more processors to perform operations comprising: receiving sensor data from a sensor associated with an autonomous vehicle operating in an environment; identifying, based at least in part on the sensor data, an object in the environment; determining, based at least in part on the sensor data, a trajectory for the object; determining, based at least in part on the sensor data and a destination for the autonomous vehicle, a trajectory for the autonomous vehicle; determining, based at least in part on the trajectory of the object and the trajectory of the autonomous vehicle, a possibility of a collision between the autonomous vehicle and the object; determining a value for a parameter associated with the possibility of the collision between the autonomous vehicle and the object; inputting the value for the parameter into a machine-learned model; receiving, from the machine-learned model, a safety metric of an event, the event corresponding to the possibility of the collision between the autonomous vehicle and the object; storing at least a portion of the sensor data associated with the event; and labeling the at least a portion of the sensor data based on the safety metric.

B. The system of paragraph A, the operations further comprising: determining a future time to the possibility of the collision between the autonomous vehicle and the object, wherein the parameter is based at least in part on the future time.

C. The system of paragraph B, wherein the sensor data is received from log data which comprises previously generated sensor data, and wherein determining the value of the parameter comprises: receiving a portion of the log data associated with a time that the sensor data was received; and determining, from the log data, the parameter associated with the event.

D. The system of any of claims A-C, the operations further comprising: determining that the autonomous vehicle disengaged from autonomous driving during a time period that includes the event; and storing, as a disengaged event, the event with the parameter in log data.

E. The system of any of claims A-D, the operations further comprising: determining that the event is unassociated with a user labeled event indicating that the event is safety related; and storing, the event, with the parameter, as an unlabeled safety related event.

F. The system of any of claims A-E, wherein the environment is a simulated environment generated for a simulation and the sensor data is simulated sensor data, the operations further comprising: determining, based at least in part on the simulated sensor data, a first number of multiple events during the simulation associated with the parameter, the multiple events including the event; determining a second number of multiple events associated with the parameter and the autonomous vehicle or a human driver in a real-world environment; determining a difference between the first number and the second number; and modifying a value associated with the parameter based at least in part on the difference.

G. A method comprising: receiving sensor data from a sensor associated with an autonomous vehicle operating in an environment; identifying, based at least in part on the sensor data, an object in the environment; determining, based at least in part on the sensor data, a trajectory for the object; determining a trajectory for the autonomous vehicle; determining, based at least in part on the trajectory of the object and the trajectory of the autonomous vehicle, a parameter associated with a safety related event; and determining, based on the parameter, a safety metric associated with the safety related event.

H. The method of paragraph G, wherein the parameter is determinable based at least in part on a possibility of a future collision and corresponds to: an estimated time to a predicted collision between the autonomous vehicle and the object, a deceleration required to avoid the predicted collision between the autonomous vehicle and the object, or a proportion of stopping distance between a remaining distance from the autonomous vehicle to the object to a location of the predicted collision and a minimum acceptable stopping distance.

I. The method of paragraph G or H, wherein determining the safety metric comprises: inputting the parameter into a machine-learned model comprising a gradient boosting classifier; and receiving, from the machine-learned model, the safety metric.

J. The method of any of claims G-I, wherein the safety metric indicates that a collision between the autonomous vehicle and the object fails to occur in a time period associated with the safety related event.

K. The method of any of claims G-J, wherein the parameter corresponds to: a lateral distance between the autonomous vehicle and the object, a speed of the autonomous vehicle, an estimated longitudinal distance associated with an unexpected acceleration or deceleration by the object, or an estimated lateral distance associated with an unexpected maneuver by the object.

L. The method of any of claims G-K, further comprising: determining that the autonomous vehicle disengaged from autonomous driving during a time period that includes the safety related event; and storing, as a disengaged event, the safety related event with the parameter in log data.

M. The method of any of claims G-L, further comprising: determining that the safety related event is unassociated with a user labeled event indicating that the safety related event is safety related; and storing the safety related event, with the parameter, as an unlabeled safety related event.

N. The method of any of claims G-M, wherein the environment is a simulated environment generated for a simulation, the method further comprising: determining a first number of multiple events during the simulation associated with the parameter, the multiple events including the event; determining a second number of multiple events associated with the parameter and the autonomous vehicle or a human driver in a real-world environment; determining a difference between the first number and the second number; and modifying a value associated with the parameter based at least in part on the difference.

O. One or more non-transitory computer-readable media storing instructions that, when executed by one or more processors, perform operations comprising: receiving sensor data from a sensor associated with an autonomous vehicle operating in an environment; identifying, based at least in part on the sensor data, an object in the environment; determining, based at least in part on the sensor data, a trajectory for the object; determining a trajectory for the autonomous vehicle; determining, based at least in part on the trajectory of the object and the trajectory of the autonomous vehicle, a parameter associated with a safety related event; and determining, based on the parameter, a safety metric associated with the safety related event.

P. The one or more non-transitory computer-readable media of paragraph O, the operations further comprising: determining a future time to a possibility of a collision between the autonomous vehicle and the object, wherein the parameter is based at least in part on the future time.

Q. The one or more non-transitory computer-readable media of paragraph P, wherein the sensor data is received from log data which comprises previously generated sensor data, and wherein determining the parameter comprises: receiving a portion of the log data associated with a time that the sensor data was received; and determining, from the log data, the parameter associated with the safety related event.

R. The one or more non-transitory computer-readable media of any of claims O-Q, wherein the parameter is determinable based at least in part on a possibility of a future collision and corresponds to: an estimated time to a predicted collision between the autonomous vehicle and the object, a deceleration required to avoid the predicted collision between the autonomous vehicle and the object, or a proportion of stopping distance between a remaining distance from the autonomous vehicle to the object to a location of the predicted collision and a minimum acceptable stopping distance.

S. The one or more non-transitory computer-readable media of any of claims O-R, wherein determining the safety metric comprises: inputting the parameter into a machine-learned model comprising an gradient boosting classifier; and receiving, from the machine-learned model, the safety metric.

T. The one or more non-transitory computer-readable media of any of claims O-S, wherein the safety metric indicates that a collision between the autonomous vehicle and the object fails to occur in a time period associated with the safety related event.

While the example clauses described above are described with respect to one particular implementation, it should be understood that, in the context of this document, the content of the example clauses can also be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While individual examples are described herein as having certain features or components, the features and components of the individual examples can be combined and used together. While the operations herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing instructions that, when executed, cause the one or more processors to perform operations comprising:
receiving sensor data from a sensor associated with an autonomous vehicle operating in an environment;
identifying, based at least in part on the sensor data, an object in the environment;

determining, based at least in part on the sensor data, a trajectory for the object;
determining, based at least in part on the sensor data and a destination for the autonomous vehicle, a trajectory for the autonomous vehicle;
determining, based at least in part on the trajectory of the object and the trajectory of the autonomous vehicle, a possibility of a collision between the autonomous vehicle and the object;
determining a value for a parameter associated with the possibility of the collision between the autonomous vehicle and the object;
inputting the value for the parameter into a machine-learned model;
receiving, from the machine-learned model, a safety metric of an event, the event corresponding to the possibility of the collision between the autonomous vehicle and the object;
storing at least a portion of the sensor data associated with the event;
labeling the at least a portion of the sensor data based on the safety metric;
determining that the event is unassociated with a user labeled event indicating that the event is safety related; and
storing the event, with the parameter, as an unlabeled safety related event.

2. The system of claim 1, the operations further comprising:
determining a future time to the possibility of the collision between the autonomous vehicle and the object,
wherein the parameter is based at least in part on the future time.

3. The system of claim 2, wherein the sensor data is received from log data which comprises previously generated sensor data, and
wherein determining the value of the parameter comprises:
receiving a portion of the log data associated with a time that the sensor data was received; and
determining, from the log data, the parameter associated with the event.

4. The system of claim 1, the operations further comprising:
determining that the autonomous vehicle disengaged from autonomous driving during a time period that includes the event; and
storing, as a disengaged event, the event with the parameter in log data.

5. The system of claim 1, wherein the environment is a simulated environment generated for a simulation and the sensor data is simulated sensor data, the operations further comprising:
determining, based at least in part on the simulated sensor data, a first number of multiple events during the simulation associated with the parameter, the multiple events including the event;
determining a second number of multiple events associated with the parameter and the autonomous vehicle or a human driver in a real-world environment;
determining a difference between the first number and the second number; and
modifying a value associated with the parameter based at least in part on the difference.

6. A method comprising:
receiving sensor data from a sensor associated with an autonomous vehicle operating in an environment;
identifying, based at least in part on the sensor data, an object in the environment;
determining, based at least in part on the sensor data, a trajectory for the object;
determining a trajectory for the autonomous vehicle;
determining, based at least in part on the trajectory of the object and the trajectory of the autonomous vehicle, a parameter associated with a safety related event;
determining, based on the parameter, a safety metric associated with the safety related event;
determining that the safety related event is unassociated with a user labeled event indicating that the safety related event is safety related; and
storing the safety related event, with the parameter, as an unlabeled safety related event.

7. The method of claim 6, wherein the parameter is determinable based at least in part on a possibility of a future collision and corresponds to:
an estimated time to a predicted collision between the autonomous vehicle and the object,
a deceleration required to avoid the predicted collision between the autonomous vehicle and the object, or
a proportion of stopping distance between a remaining distance from the autonomous vehicle to the object to a location of the predicted collision and a minimum acceptable stopping distance.

8. The method of claim 6, wherein determining the safety metric comprises:
inputting the parameter into a machine-learned model comprising a gradient boosting classifier; and
receiving, from the machine-learned model, the safety metric.

9. The method of claim 6, wherein the safety metric indicates that a collision between the autonomous vehicle and the object fails to occur in a time period associated with the safety related event.

10. The method of claim 6, wherein the parameter corresponds to:
a lateral distance between the autonomous vehicle and the object,
a speed of the autonomous vehicle,
an estimated longitudinal distance associated with an unexpected acceleration or deceleration by the object, or
an estimated lateral distance associated with an unexpected maneuver by the object.

11. The method of claim 6, further comprising:
determining that the autonomous vehicle disengaged from autonomous driving during a time period that includes the safety related event; and
storing, as a disengaged event, the safety related event with the parameter in log data.

12. The method of claim 6, wherein the environment is a simulated environment generated for a simulation, the method further comprising:
determining a first number of multiple events during the simulation associated with the parameter, the multiple events including the event;
determining a second number of multiple events associated with the parameter and the autonomous vehicle or a human driver in a real-world environment;
determining a difference between the first number and the second number; and
modifying a value associated with the parameter based at least in part on the difference.

13. The method of claim 6, further comprising:
determining that the safety related event is unassociated with the user labeled event due to one of user error or improper classification.

14. One or more non-transitory computer-readable media storing instructions that, when executed by one or more processors, perform operations comprising:
receiving sensor data from a sensor associated with an autonomous vehicle operating in an environment;
identifying, based at least in part on the sensor data, an object in the environment;
determining, based at least in part on the sensor data, a trajectory for the object;
determining a trajectory for the autonomous vehicle;
determining, based at least in part on the trajectory of the object and the trajectory of the autonomous vehicle, a parameter associated with a safety related event;
determining, based on the parameter, a safety metric associated with the safety related event;
determining that the safety related event is unassociated with a user labeled event indicating that the safety related event is safety related; and
storing the safety related event, with the parameter, as an unlabeled safety related event.

15. The one or more non-transitory computer-readable media of claim 14, the operations further comprising:
determining a future time to a possibility of a collision between the autonomous vehicle and the object,
wherein the parameter is based at least in part on the future time.

16. The one or more non-transitory computer-readable media of claim 15, wherein the sensor data is received from log data which comprises previously generated sensor data, and
wherein determining the parameter comprises:
receiving a portion of the log data associated with a time that the sensor data was received; and
determining, from the log data, the parameter associated with the safety related event.

17. The one or more non-transitory computer-readable media of claim 14, wherein the parameter is determinable based at least in part on a possibility of a future collision and corresponds to:
an estimated time to a predicted collision between the autonomous vehicle and the object,
a deceleration required to avoid the predicted collision between the autonomous vehicle and the object, or
a proportion of stopping distance between a remaining distance from the autonomous vehicle to the object to a location of the predicted collision and a minimum acceptable stopping distance.

18. The one or more non-transitory computer-readable media of claim 14, wherein determining the safety metric comprises:
inputting the parameter into a machine-learned model comprising an gradient boosting classifier; and
receiving, from the machine-learned model, the safety metric.

19. The one or more non-transitory computer-readable media of claim 14, wherein the safety metric indicates that a collision between the autonomous vehicle and the object fails to occur in a time period associated with the safety related event.

20. The one or more non-transitory computer-readable media of claim 14, the operations further comprising:
determining that the safety related event is unassociated with the user labeled event due to one of user error or improper classification.

* * * * *